(12) United States Patent
Okawa et al.

(10) Patent No.: US 9,380,840 B2
(45) Date of Patent: Jul. 5, 2016

(54) KNITTED SURFACE FASTENER

(71) Applicant: YKK Corporation, Tokyo (JP)

(72) Inventors: Mitsuhisa Okawa, Toyama-ken (JP);
Takeshi Kyuwa, Toyama-ken (JP);
Yuichi Yamashita, Toyama-ken (JP)

(73) Assignee: YKK Corporation (JP)

( * ) Notice: Subject to any disclaimer, the term of this patent is extended or adjusted under 35 U.S.C. 154(b) by 51 days.

(21) Appl. No.: 14/221,433

(22) Filed: Mar. 21, 2014

(65) Prior Publication Data

US 2014/0283343 A1    Sep. 25, 2014

(30) Foreign Application Priority Data

Mar. 22, 2013  (JP) .................. 2013-060910

(51) Int. Cl.
*A44B 18/00*   (2006.01)
*B60N 2/58*    (2006.01)

(52) U.S. Cl.
CPC .......... *A44B 18/0034* (2013.01); *B60N 2/5833* (2013.01); *Y10T 24/2767* (2015.01)

(58) Field of Classification Search
CPC .. A44B 18/0034; A47C 31/02; B60N 2/5833; B68G 7/12; Y10T 24/2767; Y10T 428/23914
USPC ............................................. 24/449; 428/86
See application file for complete search history.

(56) References Cited

U.S. PATENT DOCUMENTS

| | | | | |
|---|---|---|---|---|
| 6,206,467 B1* | 3/2001 | Mense | ..................... | B60N 2/58 297/218.2 |
| 2011/0305864 A1* | 12/2011 | Masuda | ............... | B60N 2/5833 428/86 |
| 2012/0133194 A1* | 5/2012 | Takehara | ............. | A47C 31/023 297/452.58 |

FOREIGN PATENT DOCUMENTS

JP    2004-100117 A    4/2004
WO    2010/125675 A1   11/2010

OTHER PUBLICATIONS

Office Action, Japanese Patent Application No. 2013-060910, mailed Mar. 29, 2016.

* cited by examiner

*Primary Examiner* — Robert J Sandy
*Assistant Examiner* — David Upchurch
(74) *Attorney, Agent, or Firm* — Kilpatrick Townsend & Stockton LLP

(57) ABSTRACT

A knitted surface fastener is provided that is capable of firmly forming warp knitting structure of a sewn area and achieving weight reduction as well as production costs reduction. A knitted surface fastener includes a pair of right and left sewn areas and a surface fastener area disposed between the right and left sewn areas. An average used amount of the weft insertion yarns in the sewn areas is set to be larger than an average used amount of the weft insertion yarns in the surface fastener area.

10 Claims, 18 Drawing Sheets

KNITTED SURFACE FASTENER

This application claims priority to Japanese Patent Application No. 2013-060910, which is incorporated herein by reference.

BACKGROUND OF THE INVENTION

1. Field of the Invention

The invention relates to a knitted surface fastener comprising warp knitting structure and particularly to a knitted surface fastener having a pair of right and left sewn areas which are sewn to a surface fastener adherend and a surface fastener area which is disposed between the right and left sewn areas and which has a plurality of female engagement elements formed on one face of the surface fastener area.

2. Description of the Related Art

In general, a vehicle-use seat for an automobile etc. and an office chair are respectively configured that a cover material such as a seat cover is assembled to a cushion member which is formed by synthetic resin such as urethane foam into a predetermined shape so as to cover a surface of the cushion member. Further, in a vehicle-use seat and the like, the cover material is assembled so as to wrap the cushion member after a part of the cover material is fastened to a surface of the cushion member.

In this case, a male surface fastener with a plurality of hook-shaped or mushroom-shaped male engagement elements is attached to a surface of a cushion member as a fastening means in order to fasten a part of a cover material to the surface of the cushion member, and a female surface fastener with a plurality of loop-shaped female engagement elements, which are capable of engaging with and disengaging from the male engagement elements, is attached to a rear surface of the cover material.

In general, a knitted surface fastener manufactured by a knitting machine and a woven surface fastener manufactured by a weaving machine are known as a female surface fastener with loop-shaped female engagement elements. Here, a conventional general female knitted surface fastener is explained by referring to FIGS. 17 and 18.

A conventional female knitted surface fastener 70 includes a surface fastener area 72 which has a plurality of loop-shaped female engagement elements, and right and left sewn areas 71 which are disposed adjacently on right and left outer sides of the surface fastener area 72 and which are sewn to a surface fastener adherend such as a cover material.

Further, warp knitting structure of the knitted surface fastener 70 is composed of chain knitting yarns 75 (0-1/1-0) forming each wale of the surface fastener area 72 and the right and left sewn areas 71, tricot knitting yarns 76 (0-1/2-1) disposed on two wales adjacent to each other in the surface fastener area 72, and one weft insertion yarn 77 inserted in zigzags over all wales of the surface fastener area 72 and the sewn areas 71 (a whole width of the knitted surface fastener 70).

In this case, when the knitted surface fastener 70 is knitted by a warp knitting machine, a thin sheet-shaped insertion member is provided to be protruded from one surface of a wale forming face (e.g., a tape surface) at a position corresponding to between wales of the surface fastener area 72 in the warp knitting machine, and tricot knitting yarns 76 are knitted striding over the said insertion member. Accordingly, since a portion, which strides over the insertion member of the tricot knitting yarns 76, is brought into a loose condition after being knitted, loop-shaped female engagement elements are formed between each wale of the surface fastener area 72.

Further, multifilament yarns of polyester fiber are often utilized for the chain knitting yarns 75 forming the knitted surface fastener 70, the tricot knitting yarns 76, and weft insertion yarns 77. For example, polyester textured yarns with a thickness of 150-300 decitex are utilized for the chain knitting yarns 75 and the tricot knitting yarns 76, and polyester textured yarns with a thickness of 250-400 decitex are utilized for the weft insertion yarns 77.

In the knitted surface fastener 70 having the above warp knitting structure, female engagement elements by the tricot knitting yarns 76 are formed in the surface fastener area 72, and the right and left sewn areas 71 are firmly formed by the chain knitting yarns 75 and the thick weft insertion yarns 77 so as to be capable of preventing positional shifts of stitches in the sewn areas 71. Accordingly, the sewn areas 71 of the knitted surface fastener 70 can be firmly sewn to a surface fastener adherend such as a cover material, and the surface fastener area 72, which is sandwiched by the right and left sewn areas 71, can be firmly engaged with engagement elements of male surface fastener.

Meanwhile, for example, WO 2010/125675 (Patent Document 1) discloses a knitted or woven female surface fastener (fastening member). The knitted surface fastener being one of the embodiments of a surface fastener according to Patent Document 1 comprises right and left sewn areas which are sewn to the surface fastener adherend such as a cover material, a surface fastener area which is disposed between the right and left sewn areas and which has a plurality of female engagement elements, and a connection area which connects between each sewn area and the surface fastener area.

Further, warp knitting structure of the above knitted surface fastener is composed of the chain knitting yarns forming each wale of the surface fastener area and the right and left sewn areas, the tricot knitting yarns forming a plurality of loops which are disposed in the surface fastener area and become female engagement elements, and one weft insertion yarn inserted in zigzags over a whole width of the knitted surface fastener.

In the knitted surface fastener of Patent Document 1, when it is knitted by a warp knitting machine, the tricot knitting yarns of the surface fastener area are knitted by using a knitting needle which forms a wale composed of the chain knitting yarns in the warp knitting machine and a knitting needle which adjoins the said knitting needle and avoids being entangled with the chain knitting yarns. Accordingly, loop-shaped female engagement elements disposed in the surface fastener area are formed between wales composed of chain knitting yarns by needle loops in a side which is not interlaced with the chain knitting yarns of the tricot knitting yarns.

Further, the right and left connection areas, which connects between the surface fastener area and the right and left sewn areas, are composed of only weft insertion yarns which are inserted both in the surface fastener area and in the right and left sewn areas in common. The right and left connection areas are configured to have low knitting yarn density, compared to the right and left sewn areas.

In such a knitted surface fastener of Patent Document 1, a connection area, which is configured to have low yarn density so as to be easily deformed, is disposed between the surface fastener area which has a plurality of female engagement elements and the right and left sewn areas which are sewn to a surface fastener adherend. Accordingly, the knitted surface fastener can relatively easily displace the surface fastener area against the right and left sewn areas owing to deformation of the connection area by using movement and elasticity or the like of composition yarns which form the connection area.

Accordingly, when the cover material attaching the knitted surface fastener of Patent Document 1 is fastened to the cushion member attaching a male surface fastener, for example even in a case that a fastening position of the cover material is shifted or in a case that a variation in dimensions and shapes occurs at each cover material, a prominent effect that wrinkling occurrence at the cover material, which attaches the knitted surface fastener, can be effectively prevented owing to relative displacement of the surface fastener area of the knitted surface fastener against the right and left sewn areas, can be obtained.

In addition, as the other embodiment of a surface fastener according to Patent Document 1, a knitted surface fastener which is composed of the above warp knitting structure as shown in FIG. 19 is described.

A knitted surface fastener 80 as shown in FIG. 19 also comprises right and left sewn areas 81 which are sewn to a surface fastener adherend such as a cover material, a surface fastener area 82 which is disposed between the right and left sewn areas 81 and which has a plurality of female engagement elements, and a connection area 83 which connects between each sewn area 81 and the surface fastener area 82.

Further, warp knitting structure of the surface fastener area 82 in the knitted surface fastener 80 is composed of chain knitting yarns 85 forming each wale, tricot knitting yarns 86 forming a plurality of loops to become female engagement elements, and one first weft insertion yarn 87 inserted in zigzags over the whole surface fastener area 82 (all wales of the surface fastener area 82).

Further, in the above knitted surface fastener 80, warp knitting structure of the sewn areas 81 is composed of the chain knitting yarns 85 forming each wale and second weft insertion yarns 88 inserted in zigzags over the whole sewn areas 81 (all wales of the sewn areas 81). In addition, warp knitting structure of a connection area 83 is non-densely composed of only third weft insertion yarns 89 inserted in order to connect between a wale, which is disposed at the outer edges of the surface fastener area 82, and a wale, which is disposed at the inner edges of the sewn areas 81, compared to that of the sewn areas 81.

In the knitted surface fastener 80 which is composed of the above first weft insertion yarns 87 to the third weft insertion yarns 89, since the connection area 83 which are configured to have low yarn density is disposed between the surface fastener area 82 and the right and left sewn areas 81, the surface fastener area 82 can be relatively easily displaced against the right and left sewn areas 81 and the same effect as the above can be obtained.

In addition, the knitted surface fastener 80 as shown in FIG. 19 is manufactured by concurrently knitting the surface fastener area 82, the right and left sewn areas 81, and the right and left connection areas 83. Alternatively, it is also possible to manufacture it, for example, by previously and separately knitting the surface fastener area 82 and the right and left sewn areas 81, subsequently knitting the third weft insertion yarns 89 in order to connect between the obtained surface fastener area 82 and the right and left sewn areas 81, and forming the right and left connection areas 83.

Patent Document 1: WO 2010/125675

SUMMARY OF THE INVENTION

In the warp knitting structure of the knitted surface fastener 70 as shown in FIG. 17 and the knitted surface fastener being one of the embodiments of Patent Document 1, one weft insertion yarn is inserted in zigzags over the whole width of the knitted surface fastener in order to connect each wale which is formed by the chain knitting yarns. Further, in this case, multi-filament yarns with high fineness are generally utilized for the weft insertion yarns in order to firmly knit the sewn areas of the knitted surface fastener so as to prevent shifts of stitches.

Meanwhile, in such a female knitted surface fastener, while stable engaging force is secured against a male knitted surface fastener, weight reduction and production costs reduction of the knitted surface fastener are required.

However, in a case of a knitted surface fastener which is formed by inserting one thick weft insertion yarn with high fineness over the whole width of the knitted surface fastener, although warp knitting structure of right and left sewn areas is formed firmly, a surface fastener area, which is sandwiched between the right and left sewn areas, is also formed more firmly than necessary and thus it is likely to decrease flexibility of the surface fastener area. Further, it contributes to an obstacle to weight reduction and costs reduction of the knitted surface fastener.

In addition, in a case that the above knitted surface fastener is knitted by a knitting machine, since operation which requires time to swing and insert one weft insertion yarn over the whole width of the knitted surface fastener is required whenever needle loops of the chain knitting yarns are formed at each course, it contributes to low productivity (production efficiency) and production costs increase.

Further, in the female knitted surface fastener, since the tricot knitting yarns which form loop-shaped female engagement elements are knitted in the surface fastener area, when the surface fastener is knitted, tension force applied to each chain knitting yarn (each wale) of the surface fastener area is generally higher than tension force applied to each chain knitting yarn (each wale) of the right and left sewn areas.

In this case, since the excessive tension force applied to the chain knitting yarns causes knitting yarns to snap, the surface fastener is knitted while adjusting the tension force of the chain knitting yarns in the surface fastener area to be an appropriate size. However, by knitting the surface fastener while the tension force of the chain knitting yarns in the surface fastener area is adjusted to be an appropriate size, the tension force of the chain knitting yarns in the sewn areas becomes low, and thus it is liable to cause the shapes of the chain knitting to collapse (knitting collapse) when knitting and to cause the weft insertion yarns to become loose so as to make it difficult to knit the sewn areas.

As another issue, if the tension force of the chain knitting yarns in the right and left sewn areas becomes lower than the tension force of the chain knitting yarns in the surface fastener area when the surface fastener is knitted, it is liable to cause loosening at the right and left sewn areas in the surface fastener so as to make it difficult to perform conveying operation by the conveying roller and winding operation at the winding portion when surface fasteners which are knitted sequentially are conveyed by a conveying roller and are wound at a winding portion.

Meanwhile, in the knitted surface fastener 80 as shown in FIG. 19, as weft insertion yarns, as described above, the first weft insertion yarns 87 which are disposed in the surface fastener area, the second weft insertion yarns 88 which are disposed in the sewn areas, and the third weft insertion yarns 89 which connect between the sewn areas are utilized.

Further, each yarn fineness of the first to the third weft insertion yarns 87-89 and relations of fineness between the first to the third weft insertion yarns 87-89 are not described in Patent Document 1 at all, although it is described to make the density of the knitting yarns in the connection area lower than that in the sewn areas. Further normally, when the knitted fabric is knitted while a plurality of the weft insertion yarns are inserted between a plurality of the wales, yarns having the same fineness as weft insertion yarns are utilized in order to make texture of the knitted fabric equal as a whole.

Accordingly, in the knitted surface fastener 80 as shown FIG. 19, in a case that the first to the third weft insertion yarns 87-89 have the same size of fineness, although the warp knitting structure of the right and left sewn areas is formed firmly in the same way as the above, the surface fastener area, which is sandwiched between the right and left sewn areas, is also formed more firmly than necessary and thus it is likely to decrease flexibility of the surface fastener area. Further, it contributes to an obstacle to weight reduction and production costs reduction of the knitted surface fastener.

In addition, in a case of knitting the knitted surface fastener 80 by the warp knitting machine, although the tension force of the chain knitting yarns in the surface fastener area is adjusted appropriately, the tension force of the chain knitting yarns in the right and left sewn areas is liable to become low. Thus, it causes a difficulty of knitting in the sewn areas and a difficulty of performing conveying operation by the conveying roller and winding operation at the winding portion.

The invention is implemented in view of the above conventional problems and its specific objective is to firmly form the warp knitting structure in the sewn areas, to achieve weight reduction and production costs reduction while ensuring stable engaging force of the surface fastener area and flexibility, and to provide the knitted surface fastener enabling to knit smoothly and stably by the knitting machine.

For achieving the above objective, a knitted surface fastener provided by the invention is most mainly characterized by including, as a basic structure, a pair of right and left sewn areas which are sewn to a surface fastener adherend and which are composed of a plurality of wales and a surface fastener area which is disposed between the right and left sewn areas and which has a plurality of female engagement elements formed on one face of the surface fastener area, by consisting of warp knitting structure including chain knitting yarns which form each wale of the sewn areas and the surface fastener area, tricot knitting yarns which are disposed in the surface fastener area and which form the female engagement elements, and a plurality of weft insertion yarns which are disposed in zigzags over adjoining two or more rows of wales, and by making an average used amount of the weft insertion yarns in the sewn areas larger than an average used amount of the weft insertion yarns in the surface fastener area. Here, the average used amount of the weft insertion yarns denotes a weight of the weft insertion yarns per unit area of each area when the knitted surface fastener is seen from a front and back direction (i.e., in a plane view of the knitted surface fastener).

In the knitted surface fastener according to the invention, it is especially preferable that the weft insertion yarns include first weft insertion yarns having a predetermined fineness and second weft insertion yarns having a larger fineness than the first weft insertion yarns. In this case, it is especially preferable that the first weft insertion yarns are disposed over two or more rows of wales in the surface fastener area, and the second weft insertion yarns are disposed over a wale adjacent to the sewn areas in the surface fastener area and two or more rows of wales out of wales in the sewn areas.

In the knitted surface fastener according to the invention, as the weft insertion yarns, it is preferable to dispose first direction weft insertion yarns running in zigzags over a plurality of wales and second direction weft insertion yarns running in zigzags to a direction intersecting between courses against the first direction weft insertion yarns over a plurality of wales. In this case, it is especially preferable that the first direction weft insertion yarns and the second direction weft insertion yarns are interlaced in the same stitches on a wale, which is adjacent to the sewn areas in the surface fastener area, and are folded in the opposite direction to each other.

Further, in the knitted surface fastener according to the invention, it is preferable that one of the first weft insertion yarns is disposed over all wales of the surface fastener area, and one of the second weft insertion yarns is disposed over all wales of each sewn area and a wale which is adjacent to the sewn areas in the surface fastener area.

In addition, it is preferable that the knitted surface fastener of the invention includes a connection area which is composed of only the first weft insertion yarns or the second weft insertion yarns between the surface fastener area and the sewn areas.

Further, in the knitted surface fastener according to the invention, it is preferable that in the surface fastener area, one of the first weft insertion yarns strides over the connection area and is disposed over all wales of the surface fastener area and a wale adjacent to the connection area in the sewn areas. Further, it is preferable that a plurality of the first weft insertion yarns is disposed over two or more rows of wales, and in the right and left sewn areas, one of the second weft insertion yarns is disposed over all wales of the sewn areas, respectively.

In addition, in the knitted surface fastener according to the invention, it is preferable that in the surface fastener area and the right and left sewn areas, a plurality of the first direction weft insertion yarns running over three or more rows of wales and a plurality of the second direction weft insertion yarns running over wales, which have the same number of the rows of wales as the first direction weft insertion yarns, are disposed. And it is preferable that stitches on a wale, in which both the first direction weft insertion yarns and the second direction weft insertion yarns are interlaced into a same course and are folded in the opposite direction to each other, are disposed diagonally in the warp knitting structure.

In addition, it is preferable that a plurality of the first direction weft insertion yarns running over two rows of wales is disposed in the surface fastener area, and a plurality of the first direction weft insertion yarns and a plurality of the second direction weft insertion yarns are disposed in the right and left sewn areas.

The knitted surface fastener according to the invention includes a pair of right and left sewn areas and a surface fastener area disposed between the right and left sewn areas, and an average weight of the weft insertion yarns per unit area in the sewn areas is set to be larger than an average weight of the weft insertion yarns per unit area in the surface fastener area.

For example, by controlling fineness of inserted weft insertion yarns and inserted density in each area, and as described above, by increasing the average weight of the weft insertion yarns per unit area in the sewn areas than the average weight of the weft insertion yarns per unit area in the surface fastener area, the warp knitting structure in the sewn areas is formed firmly and is capable of hardly generating shifts of stitches.

Further, in the knitted surface fastener of the invention, by making the average weight of the weft insertion yarns per unit area in the surface fastener relatively small, for example, compared to a case that the average weight of the weft insertion yarns per unit area is the same between the surface fastener and the sewn areas, it is possible to enhance flexibility of the surface fastener area, and to achieve weight reduction of the whole knitted surface fastener by reduction of overall used amount of the weft insertion yarns and production costs reduction accompanied by reduction of unit requirement.

In addition, by making the average weight of the weft insertion yarns per unit area in the sewn areas larger than the average weight of the weft insertion yarns per unit area in the possible to relatively increase a size of tension force which is applied to each chain knitting yarn in the sewn areas so as to close to a size of tension force which is applied to each chain knitting yarn in the surface fastener area, or so as to be larger than a size of tension force which is applied to each chain knitting yarn in the surface fastener area.

In this way, in the invention, it is possible to adjust the size of the tension force of the chain knitting yarns over the whole width direction of the knitted surface fastener to an appropriate size, by making the size of the tension force which is applied to each chain knitting yarn in the sewn areas when the knitted surface fastener is knitted, approximately equal with, or larger than the size of the tension force which is applied to each chain knitting yarn in the surface fastener area. Accordingly, for example, as is the case that a conventional knitted surface fastener is knitted, it is possible to effectively prevent shape collapse of the chain knitting in the sewn areas and malfunction occurrence such as loosing of the weft insertion yarns, and to stably and smoothly carry out knitting process of the knitted surface fastener by the warp knitting machine.

In addition, in the invention, since it is possible to adjust the tension force of the chain knitting yarns over the whole width direction of the knitted surface fastener to an appropriate size, it is possible to perform conveying operation by the conveying roller and winding operation at the winding portion smoothly, when the surface fasteners, which are knitted sequentially by the warp knitting machine, are conveyed by a conveying roller and are wound at a winding portion.

Especially in the invention, the weft insertion yarns include first weft insertion yarns having a predetermined fineness and second weft insertion yarns having a larger fineness than the first weft insertion yarns. In this case, the first weft insertion yarns are disposed over two or more rows of wales in the surface fastener area, and the second weft insertion yarns are disposed over a wale adjacent to the sewn areas in the surface fastener area and two or more rows of wales out of wales in the sewn areas.

Namely, the warp knitting structure of the knitted surface fastener according to the invention is composed of chain knitting yarns which form each wale of the sewn areas and a surface fastener area, tricot knitting yarns which are disposed in the knitted surface fastener and which form female engagement elements, first weft insertion yarns which are disposed over two or more rows of wales in the surface fastener area and which have a predetermined fineness, and second weft insertion yarns which are disposed over a wale adjacent to the sewn areas in the surface fastener area and two or more rows of wales out of wales in the sewn areas and which have a larger fineness than the first weft insertion yarns.

Further, in the invention, if first weft insertion yarns are disposed over two or more rows of wales in the surface fastener area, the said first weft insertion yarns are allowed to be inserted striding over a wale in the sewn areas, and if second weft insertion yarns are disposed over a wale adjacent to the sewn areas in the surface fastener area and two or more rows of wales out of wales in the sewn areas, the said second weft insertion yarns are allowed to be inserted striding over two or more rows of wales in the surface fastener area.

According to the above knitted surface fastener of the invention, since the sewn areas are composed of the second weft insertion yarns having a larger fineness than the first weft insertion yarns (in other words, the second weft insertion yarns which are thicker than the first weft insertion yarns), the warp knitting structure of the sewn areas is formed firmly and is capable of hardly generating shifts of stitches.

Further, in the knitted surface fastener of the invention, since the first weft insertion yarns having a smaller fineness than the second weft insertion yarns are disposed in the surface fastener area over two or more rows of wales of the surface fastener area, for example compared to a case that weft insertion yarns having the same fineness are disposed in the surface fastener and the sewn areas, it is possible to enhance flexibility of the surface fastener area while ensuring stable engaging force of the surface fastener area, and to achieve weight reduction of the whole knitted surface fastener by reduction of overall used amount of the weft insertion yarns and production costs reduction by reduction of unit requirement.

In addition, the knitted surface fastener of the invention is different from, for example, a conventional knitted surface fastener and the like whose warp knitting structure is shown in FIG. 17 in that the knitted surface fastener can be formed without inserting the first weft insertion yarns and the second weft insertion yarns over a whole width of the knitted surface fastener (i.e., a whole fastener surface area and right and left sewn areas), for example, by inserting one or a plurality of the first weft insertion yarns into the whole surface fastener area and inserting one or a plurality of the second weft insertion yarns into the whole each sewn area.

Therefore, since in the process of knitting the knitted surface fastener of the invention by a warp knitting machine it is possible to make inserting operation of the first and the second weft insertion yarns small, compared to a case that the first and the second weft insertion yarns are swung and inserted over the whole width of the knitted surface fastener, when needle loops of the chain knitting yarns is formed at each course, it is possible to shorten time required for knitting by efficiently carrying out the knitting process of the knitted surface fastener. Therefore, it is possible to enhance productivity (work efficiency) of the knitted surface fastener and achieve further production costs reduction.

In addition, the inventors and the like identified, through their research about the size of the tension force applied to each chain knitting yarn (each wale) when the knitted surface fastener is knitted, that in the knitted surface fastener of the invention it is possible to relatively increase the size of the tension force applied to each chain knitting yarn in the sewn areas so as to close to the size of the tension force applied to each chain knitting yarn in the surface fastener area, or so as to make it larger than the size of the tension force applied to each chain knitting yarn in the surface fastener area, by making the second weft insertion yarns disposed in the right and left sewn areas thicker than the first weft insertion yarns of the surface fastener area in which the tricot knitting yarns are knitted.

In this way, in the invention, it is possible to adjust the size of the tension force of the chain knitting yarns over the whole width direction of the knitted surface fastener to an appropriate size, by making the size of the tension force which is applied to each chain knitting yarn in the sewn areas when the knitted surface fastener is knitted, approximately equal with, or larger than the size of the tension force which is applied to each chain knitting yarn in the surface fastener area. Accordingly, for example as is the case that a conventional knitted surface fastener is knitted, it is possible to effectively prevent shape collapse of the chain knitting in the sewn areas and malfunction occurrence such as loosing of the weft insertion yarns, and to stably and smoothly carry out knitting process of the knitted surface fastener by the warp knitting machine.

In addition, in the invention, since it is possible to adjust the tension force of the chain knitting yarns over the whole width direction of the knitted surface fastener to an appropriate size, it is possible to perform conveying operation by the conveying roller and winding operation at the winding portion smoothly, when the surface fasteners, which are knitted sequentially by the warp knitting machine, are conveyed by a conveying roller and are wound at a winding portion.

In such a knitted surface fastener of the invention, as the weft insertion yarns, first direction weft insertion yarns running in zigzags over a plurality of wales and second direction weft insertion yarns running in zigzags to a direction of intersecting between courses against the first direction weft insertion yarns over a plurality of wales, are disposed. Accordingly, it is possible to prevent positional shifts of stitches of the chain knitting yarns in which the first direction weft insertion yarns and the second direction weft insertion yarns are interlaced and are folded in the opposite direction to each other so as to stabilize the warp knitting structure of the knitted surface fastener.

In this case, since the first direction weft insertion yarns and the second direction weft insertion yarns are interlaced in a same stitch on a wale adjacent to the sewn areas in the surface fastener area and are folded in the opposite direction to each other, it is possible to effectively prevent positional shifts of stitches on the said wale so as to stabilize a relative position of the surface fastener area in the knitted surface fastener. Accordingly, it is possible to stably place a plurality of female engagement elements at a predetermined position of the knitted surface fastener.

Further, in the knitted surface fastener according to the invention, one first weft insertion yarn is disposed over all wales in the surface fastener area, and one second weft insertion yarn is disposed over all wales in each sewn area and a wale adjacent to the sewn areas in the surface fastener area. Here, one first weft insertion yarn and one second weft insertion yarn denote a state of there being one route in which weft insertion yarns run in each area with respect to a wale direction and a course direction. For example, first weft insertion yarns (or second weft insertion yarns) disposed on a same running route with respect to the wale direction and the course direction in a state of bundling two or more yarns (including mono-filament and multi-filament) are included into one first weft insertion yarn (or one second weft insertion yarn).

The first weft insertion yarns and the second weft insertion yarns being disposed in such a way, it is possible to effectively carry out weight reduction of the knitted surface fastener and production costs reduction by reduction of unit requirement, and to efficiently carry out knitting process of the knitted surface fastener so as to further enhance productivity of the knitted surface fastener.

In addition, the knitted surface fastener of the invention may be composed of the first weft insertion yarns or the second weft insertion yarns between the surface fastener area and the sewn areas, and may comprise the connection area in which the chain knitting yarns are not disposed. For example, the knitted surface fastener of the invention is constituted in a state that in the surface fastener area, one first weft insertion yarn strides over the connection area and is disposed over all wales of the surface fastener area and a wale adjacent to the connection area in the sewn areas, and a plurality of the first weft insertion yarns are disposed over two or more rows of wales, further, and in a state that in the respective right and left sewn areas, one second weft insertion yarn is disposed over all wales of the said sewn areas. Here, the state that a plurality of the first weft insertion yarns are disposed denotes that a state that each first weft insertion yarn is arranged to make its running route to be shifted to a course direction to each other.

It is possible to further reduce production costs of the knitted surface fastener having a predetermined dimension (width dimension) to the width direction of the knitted surface fastener, since the chain knitting yarns are removed in the connection area so as to reduce unit requirement of the knitted surface fastener since the knitted surface fastener of the invention includes such a connection area.

In addition, in the knitted surface fastener of the invention, in the surface fastener area and the right and left sewn areas, a plurality of the first direction weft insertion yarns running over three or more rows of wales and a plurality of the second direction weft insertion yarns running over wales which have the same number of the rows of wales as the first direction weft insertion yarns are disposed. And stitches on a wale, in which both the first direction weft insertion yarns and the second direction weft insertion yarns are interlaced into a same course and are folded in the opposite direction to each other, are disposed diagonally in the warp knitting structure.

Since the knitted surface fastener of the invention is comprised of such first direction weft insertion yarns and second direction weft insertion yarns, it is possible to prevent positional shifts of stitches of the knitted surface fastener as a whole so as to form the warp knitting structure firmly, and possible to maintain its warp knitting structure stably over a long time.

In addition, in the knitted surface fastener according to the invention, a plurality of the first direction weft insertion yarns running over two rows of wales is disposed in the surface fastener area, and a plurality of the first direction weft insertion yarns and a plurality of the second direction weft insertion yarns are disposed in the respective right and left sewn areas. Accordingly, it is possible to further enhance flexibility of the surface fastener area in the knitted surface fastener, and to form the warp knitting structure of the right and left sewn areas firmly so as to prevent positional shifts of stitches effectively.

DESCRIPTION OF THE EMBODIMENTS

In the following, suitable embodiments of the invention will be described in detail with examples and with reference to the drawings. Further, not being limited to the embodiments described in the following, the invention can be variously modified, as long as having substantially the same structure as that of the invention and performing similar operational effects.

For example, a knitted surface fastener, which is described in each following embodiment, is sewn to a cover material of a vehicle-use seat arranged in an automobile and is utilized. However, it is also possible that the knitted surface fastener according to the invention is utilized for a seat which is arranged in a vehicle other than an automobile and for an office chair or the like. Further, dimensions of the surface fastener area and the sewn areas in the knitted surface fastener and the number of formed wales or the like can be also changed arbitrarily.

(First Embodiment)

Figure 1:
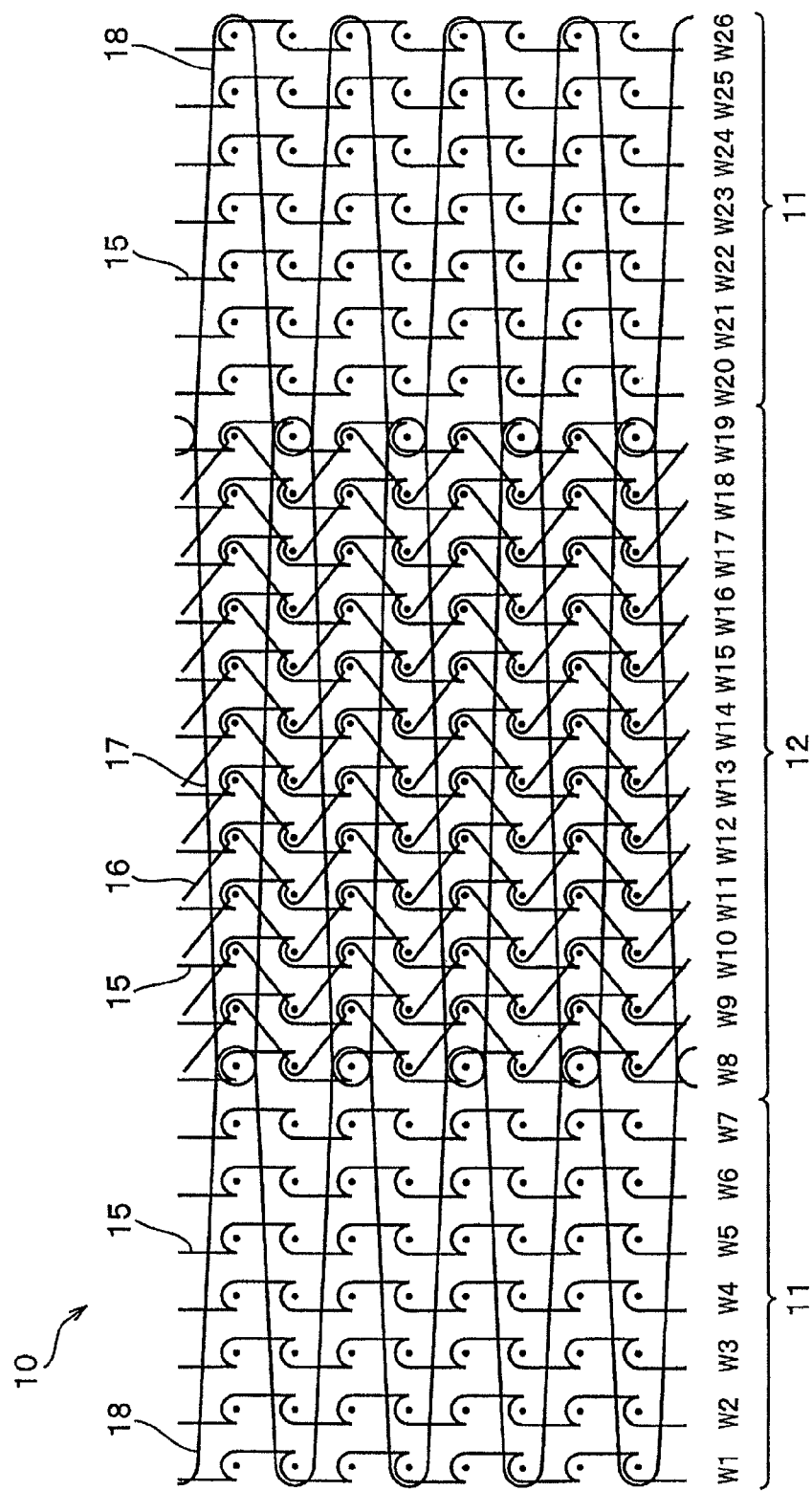
FIG. 1 is a knitting structure view showing warp knitting structure of a knitted surface fastener according to a first embodiment of the invention.
Figure 2:
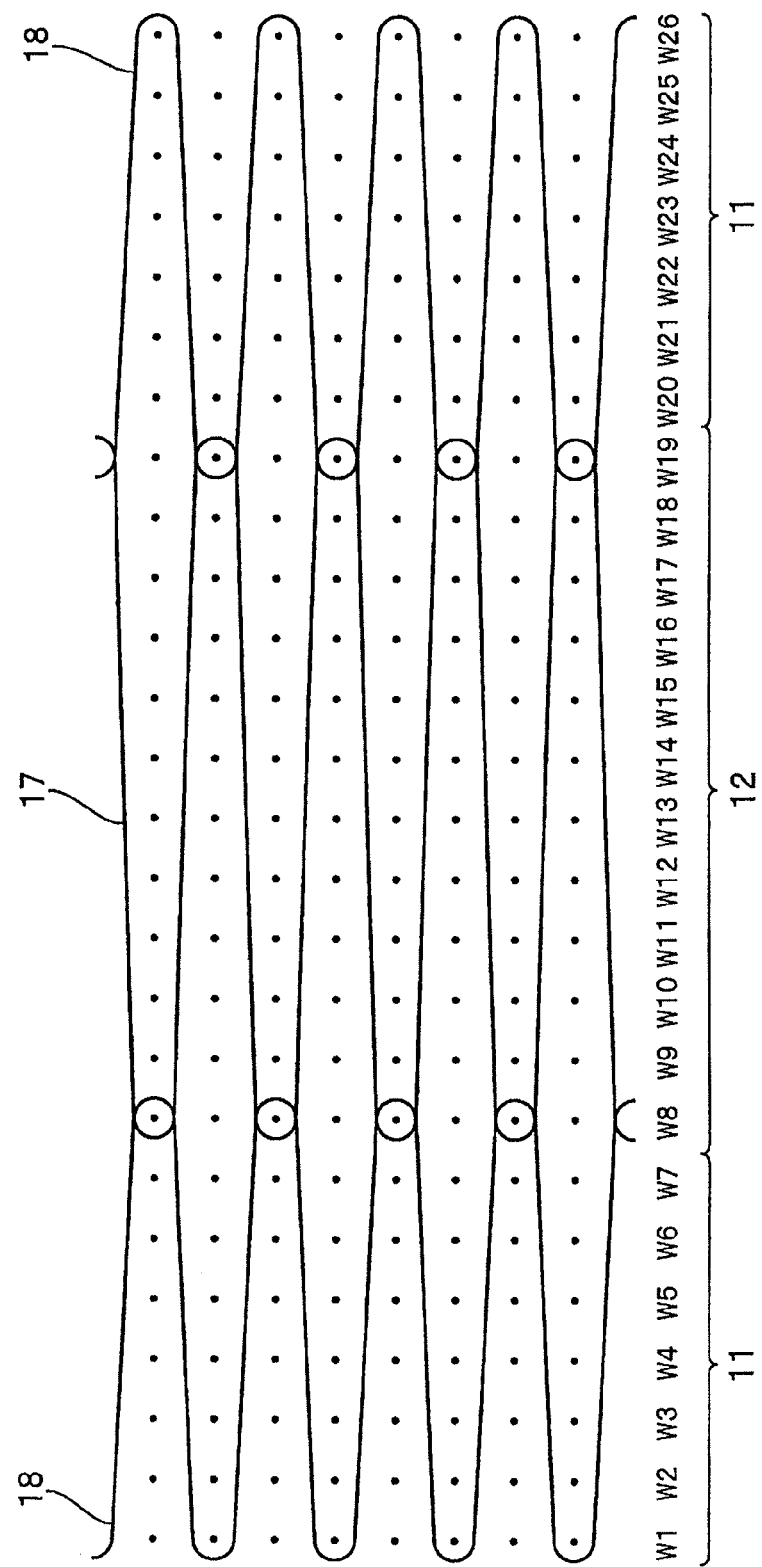
FIG. 2 is a structure diagram of weft insertion yarns utilized in the knitted surface fastener.
Figure 3:
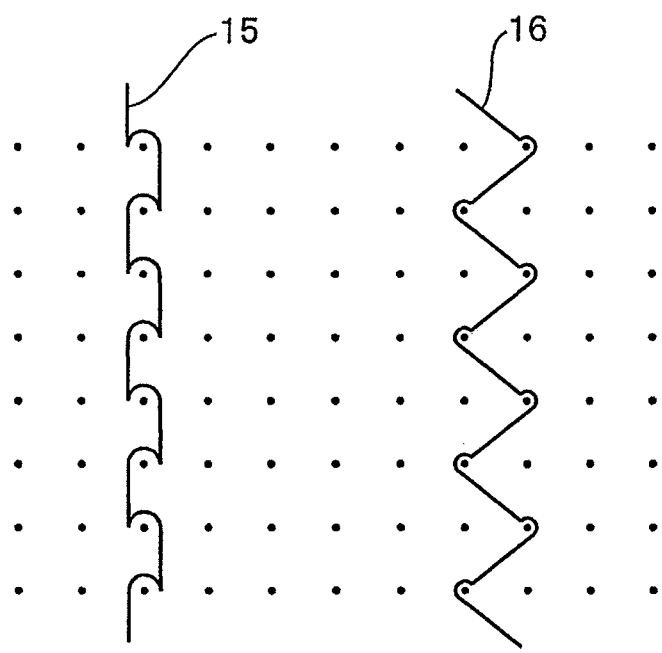
FIG. 3 is a structure diagram of chain knitting yarns and tricot knitting yarns utilized in the knitted surface fastener.

FIG. 1 is a knitting structure view showing warp knitting structure of a knitted surface fastener according to a first embodiment of the invention. FIG. 2 is a structure diagram of weft insertion yarns utilized in the knitted surface fastener, and FIG. 3 is a structure diagram of chain knitting yarns and tricot knitting yarns utilized in the knitted surface fastener.

Further, in the following, a length direction (warp direction) of the knitted surface fastener is stipulated as a front and back direction, and a width direction (weft direction) of the knitted surface fastener is stipulated as a right and left direction.

A knitted surface fastener 10 of the first embodiment is comprised as a female surface fastener in which a plurality of loop-shaped female engagement elements 12a are disposed in a surface fastener area 12, and as described below, it is sewn to a cover material 2 of a vehicle-use seat 1 and is utilized.

The knitted surface fastener 10 of the first embodiment is composed of warp knitting structure knitted by a warp knitting machine, and includes a surface fastener area 12 having a plurality of loop-shaped female engagement elements 12a as well as right and left sewn areas 11 disposed adjacent to both right and left sides of the surface fastener area 12. In this case, the right and left sewn areas 11 are to be portions through which sewn yarns 7 are thrust when the knitted surface fastener 10 of the first embodiment is sewn to a seam portion 2b of a cover material 2 (See FIG. 5).

Further, the knitted surface fastener 10 of the first embodiment includes wales which are composed of 26 rows of the chain knitting yarns 15. When a wale, which is formed at one side end edge (left side of side end edge) in the knitted surface fastener 10, is stipulated as a first wale W1, and wales from a wale, which adjoins the first wale W1, through a wale, which is formed at the other side end edge (right side of side end edge) in the knitted surface fastener 10, are stipulated as a second wale W2 to a 26th wale W26 in turns, the surface fastener area 12 is formed by wales from a 8th wale W8 to a 19th wale W19, and right side and left side of the sewn areas 11 are formed by wales from a first wale W1 to a 7th wale W7 and by wales from a 20th wale W20 to a 26th wale W26, respectively.

The surface fastener area 12 of the first embodiment is composed of chain knitting yarns 15 (0-1/1-0) forming each wale, tricot knitting yarns 16 (0-1/2-1) of open stitches disposed over two rows of wales adjacent to each other, and one first direction first weft insertion yarn 17 (12-12/0-0) inserted in zigzags over all wales of the surface fastener area 12 (i.e., from the 8th wale W8 to the 19th wale W19).

Each tricot knitting yarn 16 of the surface fastener area 12 runs in zigzags striding over two rows of wales adjacent to each other and forms a plurality of loops to become female engagement elements 12a between each wale, while forming needle loops which are interlaced with needle loops of the chain knitting yarns 15. Further, in the invention, the tricot knitting yarns 16 disposed in the surface fastener area 12 may be knitted with close stitches, not with open stitches.

In this case, when the knitting surface fastener 10 is knitted by the warp knitting machine, a thin sheet-shaped insertion member is provided to be protruded from one surface side of a wale forming face (e.g., a surface of a surface fastener) at a position corresponding to between wales of the surface fastener area 12 in the warp knitting machine, and tricot knitting yarns 16 are knitted in the surface fastener area 12 to stride over the said insertion member. Accordingly, a knitted portion to stride over an insertion member of the tricot knitting yarns 16 is brought into a loose condition by removing the insertion member after knitting so as to be formed as loop-shaped female engagement elements 12a between each wale of the surface fastener area 12.

Further, in the first embodiment, needle loops of the tricot knitting yarns 16 are formed to rotate in the opposite direction to needle loops of the chain knitting yarns 15 when being interlaced with the needle loops of the chain knitting yarns 15. In this way, since the tricot knitting yarns 16 and the chain knitting yarns 15 are knitted to rotate the needle loops in the opposite direction to each other, although the reason is unknown, it is possible to strength tightness of a root portion in a loop of the tricot knitting yarns 16 which comprise female engagement elements 12a, and thus, it is possible to form each wale of the surface fastener area 12 firmly and strongly. Further, in the invention, it is also possible to form the needle loops of the tricot knitting yarns 16 to rotate in a same direction as the needle loops of the chain knitting yarns 15, when the needle loops of the tricot knitting yarns 16 is interlaced with the needle loops of the chain knitting yarns 15.

In the first embodiment, multi-filament yarns of polyester fiber are utilized for the chain knitting yarns 15, the tricot knitting yarns 16, and the first direction first weft insertion yarns 17 which form the surface fastener area 12. Further, in the invention, material of the chain knitting yarns 15, the tricot knitting yarns 16, the first weft insertion yarns 17, and the second weft insertion yarns 18 described below is not particularly limited and can be arbitrarily changed.

The chain knitting yarns 15 and the tricot knitting yarns 16 which form the surface fastener area 12 have a fineness of ≥110 decitex ≤300 decitex. Especially in the first embodiment, the chain knitting yarns 15 have a fineness of 280 decitex, and the tricot knitting yarns 16 have a fineness of 167 decitex. Further, the first direction first weft insertion yarns 17 forming the surface fastener area 12 have a fineness of ≥167 decitex ≤990 decitex, especially in the first embodiment, have a fineness of 334 decitex in total, since the first direction first weft insertion yarns 17 forming the surface fastener area 12 are utilized in a state of bundling two yarns having a fineness of 167 decitex per one yarn (i.e., 167 decitex×two yarns).

Each right and left sewn area 11 is composed of the chain knitting yarns 15 (0-1/1-0) forming each wale and one second weft insertion yarn 18 (0-0/8-8) inserted in zigzags over the 8th wale W8 or the 19th wale W19 adjacent to the sewn areas 11 in the surface fastener area 12 and all wales in the sewn areas 11 (i.e., the first wale W1 to the 7th wale W7, or the 20th wale W20 to the 26th wale W26), respectively.

The second weft insertion yarns 18 disposed in each sewn area 11 are inserted in zigzags in the second direction intersecting between courses with the first direction first weft insertion yarns 17 disposed in the surface fastener area 12 over eight rows of wales (the first wale W1 to the 8th wale W8, or the 19th wale W19 to the 26th wale W26), and connect the above eight rows of wales mutually.

In this case, the first direction first weft insertion yarns 17 disposed in the surface fastener area 12 and the second direction second weft insertion yarns 18 disposed in each sewn area 11 are disposed to interlace in the same stitches on the 8th wale W8 and the 19th wale W19 adjacent to the sewn areas 11 in the surface fastener area 12, and to be folded in the opposite direction to each other. Accordingly, it is possible to prevent positions of stitches on the 8th wale W8 and the 19th wale W19, in which the first direction first weft insertion yarns 17 and the second direction second weft insertion yarns 18 are interlaced, from being relatively displaced in the right and left direction, and to stabilize the warp knitting structure of the knitted surface fastener 10 (especially, the warp knitting structure of the surface fastener area 12).

In the first embodiment, multi-filament yarns of polyester fiber are utilized for the chain knitting yarns 15 and the second direction second weft insertion yarns 18 which form the sewn areas 11. Further, the chain knitting yarns 15 disposed in the sewn areas 11 have the same fineness as the chain knitting yarns 15 disposed in the surface fastener area 12.

The second weft insertion yarns 18 disposed in the sewn areas 11 of the first embodiment have larger fineness than the first weft insertion yarns 17 disposed in the surface fastener area 12, and moreover, have a fineness of ≥280 decitex ≤1320 decitex. In particular, the second weft insertion yarns 18 of the first embodiment are utilized in a state of bundling two yarns having a fineness of 167 decitex per one yarn (i.e., 167 decitex×two yarns). In this way, by making a fineness of the second weft insertion yarns 18 disposed in the sewn areas 11 larger than that of the first weft insertion yarns 17 disposed in the surface fastener area 12, it is possible to form the warp knitting structure of the sewn areas 11 firmly so that positional shifts of stitches in the sewn areas 11 can be hardly generated.

Figure 4:
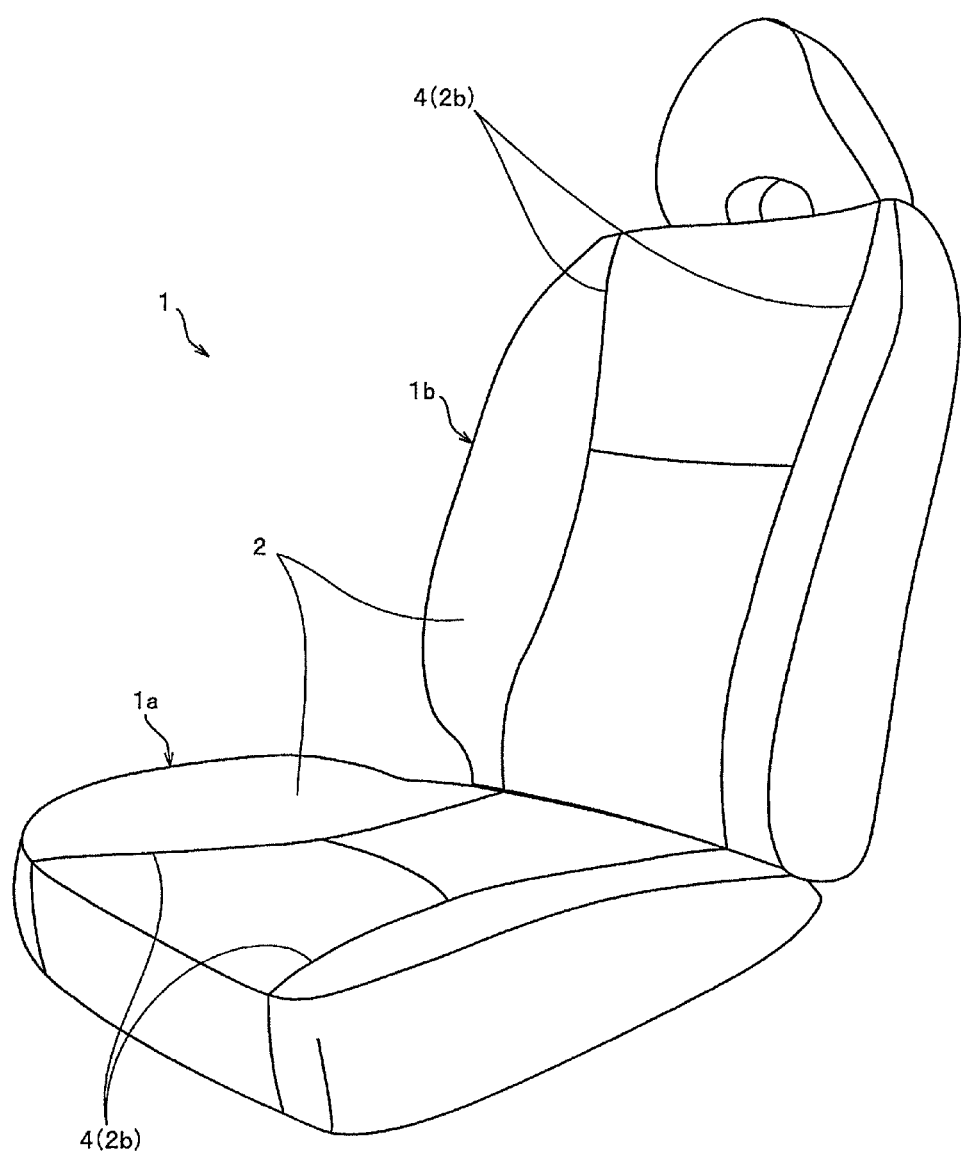
FIG. 4 is a perspective view showing a vehicle-use seat in which the knitted surface fastener is utilized.

Such a female knitted surface fastener 10 of the first embodiment, for example, in a vehicle-use seat 1 as shown in FIG. 4, is utilized as a fastening member to fasten a cover material 2 to a cushion member 3. Here, structure to sew the knitted surface fastener 10 of the first embodiment to the seam portion 2b of the cover material 2 and to fasten the cover material 2 to the cushion member 3 is described.

Figure 5:
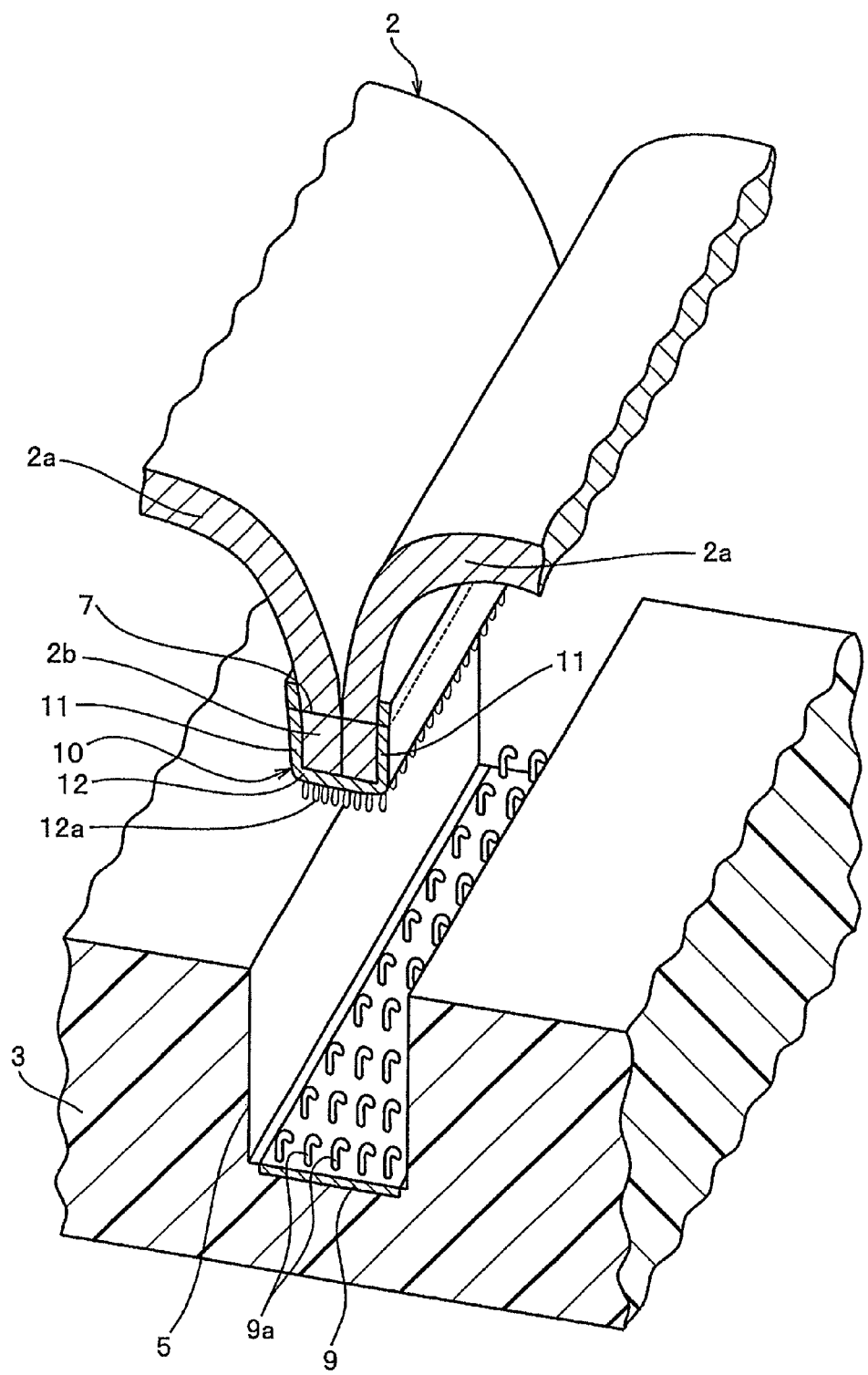
FIG. 5 is a schematic view showing a male surface fastener fixed to a cushion member and a female knitted surface fastener sewn to a cover material.

The vehicle-use seat 1 shown in FIG. 4 includes a seat cushion (a seat portion) 1a and a seat back (a back rest) 1b. The seat cushion 1a and the seat back 1b are formed respectively by assembling the cover material 2 obtained as sewing a plurality of cover pieces 2a to the cushion member 3 made of resin foam formed into a predetermined shape. Design grooves 4 structured by a seam portion 2b of the cover material 2 are formed at a surface of each of the seat cushion 1a and the seat back 1b. Further, concave grooves 5 as shown in FIG. 5 are formed at positions corresponding to the design grooves 4 of the cushion member 3.

To manufacture the above vehicle-use seat 1, the female knitted surface fastener 10 of the first embodiment is sewn along the seam portion 2b of the cover material 2 as the fastening member to be fastened to the cushion member 3. The knitted surface fastener 10 wraps end parts of the cover pieces 2a by folding the right and left sewn areas 11 along the cover pieces 2a while the surface fastener area 12 is contacted to end faces of the cover pieces 2a as a plurality of female engagement elements 12a being downwardly oriented.

Especially in the knitted surface fastener 10 of the first embodiment, by making a fineness of the first weft insertion yarns 17 disposed in the surface fastener area 12 smaller than a fineness of the second weft insertion yarns 18 disposed in the sewn areas 11, a fineness of weft insertion yarns is made to be different between the surface fastener area 12 and the sewn areas 11. Accordingly, since the knitted surface fastener 10 of the first embodiment is easily bent at a boundary portion between the surface fastener area 12 and the sewn areas 11, the operation of bending the knitted surface fastener 10 can be easily carried out along the cover pieces 2a when attaching to the cover material 2, and it is possible to stably wrap end parts of the cover pieces 2a in the knitted surface fastener 10.

Further, the knitted surface fastener 10 of the first embodiment is sewn with the sewing yarns 7 by sewing the right and left sewn areas 11 of the knitted surface fastener 10 to the two cover pieces 2a concurrently when two cover pieces 2a are sewn with the sewing yarns 7. In this case, as having firm warp knitting structure which hardly generate positional shifts of stitches owing to thick second weft insertion yarns 18 inserted in the right and left sewn areas 11 of the knitted surface fastener 10, the right and left sewn areas 11 are firmly sewn to the seam portion 2b of the cover material 2 by sewing yarns 7.

Meanwhile, a male surface fastener 9 having a plurality of hook-shaped male engagement elements 9a at an upper face side is fixed to a bottom portion of the concave groove 5 formed at the cushion member 3. The male surface fastener 9 is integrated with the cushion member 3 by mold-in forming.

Then, the female knitted surface fastener 10 sewn to the seam portion 2b of the cover material 2 is inserted into the concave groove 5 of the cushion member 3 and the loop-shaped female engagement elements 12a arranged at the surface fastener area 12 of the knitted surface fastener 10 are engaged with the male engagement elements 9a of the male surface fastener 9 which is fixed to the cushion member 3. Accordingly, the cover material 2 can be easily fastened to the cushion member 3 and the vehicle-use seat 1 can be manufactured.

As described above, in the female knitted surface fastener 10 of the first embodiment which is sewn to the cover material 2, the first weft insertion yarns 17 disposed in the surface fastener area 12 have a smaller fineness than the second weft insertion yarns 18 disposed in the sewn areas 11, and are formed thin. Accordingly, an average weight of the second weft insertion yarns 18 per unit area disposed in the sewn areas 11 is set to be larger than an average weight of the first weft insertion yarns 17 per unit area disposed in the surface fastener area 12.

Therefore, the knitted surface fastener 10 of the first embodiment 1 can enhance flexibility of the surface fastener area 12 while ensuring stable engaging force of the surface fastener area 12, for example, compared to a conventional female knitted surface fastener in which weft insertion yarns having the same fineness as in the surface fastener area and in the sewn areas are utilized. Further, it is possible to achieve weight reduction of the whole knitted surface fastener 10 and production costs reduction by reduction of unit requirement.

Further, in the knitted surface fastener 10 of the first embodiment, neither the first weft insertion yarns 17 nor the second weft insertion yarns 18 are inserted over the whole width of the knitted surface fastener 10, and both the first weft insertion yarns 17 and the second weft insertion yarns 18 are inserted over wales which have half or less numbers of wales out of all rows of wales comprising the knitted surface fastener 10. In other words, all wales of the knitted surface fastener 10 are connected with total three weft insertion yarns composed of one first weft insertion yarn 17 and two second weft insertion yarns 18. Accordingly, even in a case that a position of stitches of the chain knitting yarns 15 comprising each wale is shifted in a right and left direction, since each stitch can move only in an area in which the first weft insertion yarns 17 or the second weft insertion yarns 18 are disposed, it is possible to minimize positional shifts of stitches.

In addition, since both the first weft insertion yarns 17 and the second weft insertion yarns 18 which are disposed in the knitted surface fastener 10 are inserted over wales which have half or less numbers of wales out of all rows of wales comprising the knitted surface fastener 10, when the knitted surface fastener 10 is knitted by the warp knitting machine, it is possible to make operation of inserting the first weft insertion yarns 17 and the second weft insertion yarns 18 by the warp knitting machine to be small, compared to a case of swinging and inserting over the whole width of the knitted surface fastener 10 like a conventional knitted surface fastener 10. Accordingly, it is possible to efficiently carry out the knitting process of the knitted surface fastener 10 and to shorten a time required for knitting. Therefore, it is possible to enhance production speed of the knitted surface fastener 10 and its productivity (work efficiency), so that further production costs reduction can be achieved.

Further, in the warp knitting machine for knitting the knitted surface fastener of the first embodiment by inserting one first weft insertion yarn 17 and two second weft insertion yarns 18, structure of an apparatus is not complicated compared to a warp knitting machine which swings and inserts weft insertion yarns over the whole width of the knitted surface fastener like a conventional knitted surface fastener, rather, the structure of the warp knitting machine may be simplified since special parts to swing and insert weft insertion yarns over the whole width of the knitted surface fastener are not required.

In addition, in the knitted surface fastener 10 of the first embodiment, by making the second weft insertion yarns 18 disposed in the sewn areas 11 thicker than the first weft insertion yarns 17 disposed together with the tricot knitting yarns 16 in the surface fastener area 12, when the knitted surface fastener 10 is knitted by the warp knitting machine, the size of tension force applied to each chain knitting yarn 15 (each wale) in the right and left sewn areas 11 and the size of tension force applied to each chain knitting yarn 15 (each wale) in the surface fastener area 12 can be made approximately equal with each other, or the size of tension force applied to each chain knitting yarn 15 (each wale) in the right and left sewn areas 11 can be made larger than the size of the tension force applied to each chain knitting yarn 15 (each wale) in the surface fastener area 12.

Therefore, due to the small tension force of the chain knitting yarns 15 which are knitted in the sewn areas 11, collapsing the shapes of the chain knitting which are knitted in the sewn areas 11 (knitting collapse) and causing weft insertion yarns which are inserted in the sewn areas 11 to become loose can be prevented, so that knitting the knitted surface fastener 10 is carried out easily and the knitted surface fastener 10 can be knitted smoothly and stably. In addition, when the knitted surface fastener 10 is knitted by the warp knitting machine and thereafter the knitted surface fastener is conveyed by a conveying roller and is wound at a winding portion, conveying operation by the conveying roller and winding operation at the winding portion can be performed smoothly, so that the knitted surface fastener 10 can be manufactured stably without causing malfunction.

(Second Embodiment)

Figure 6:
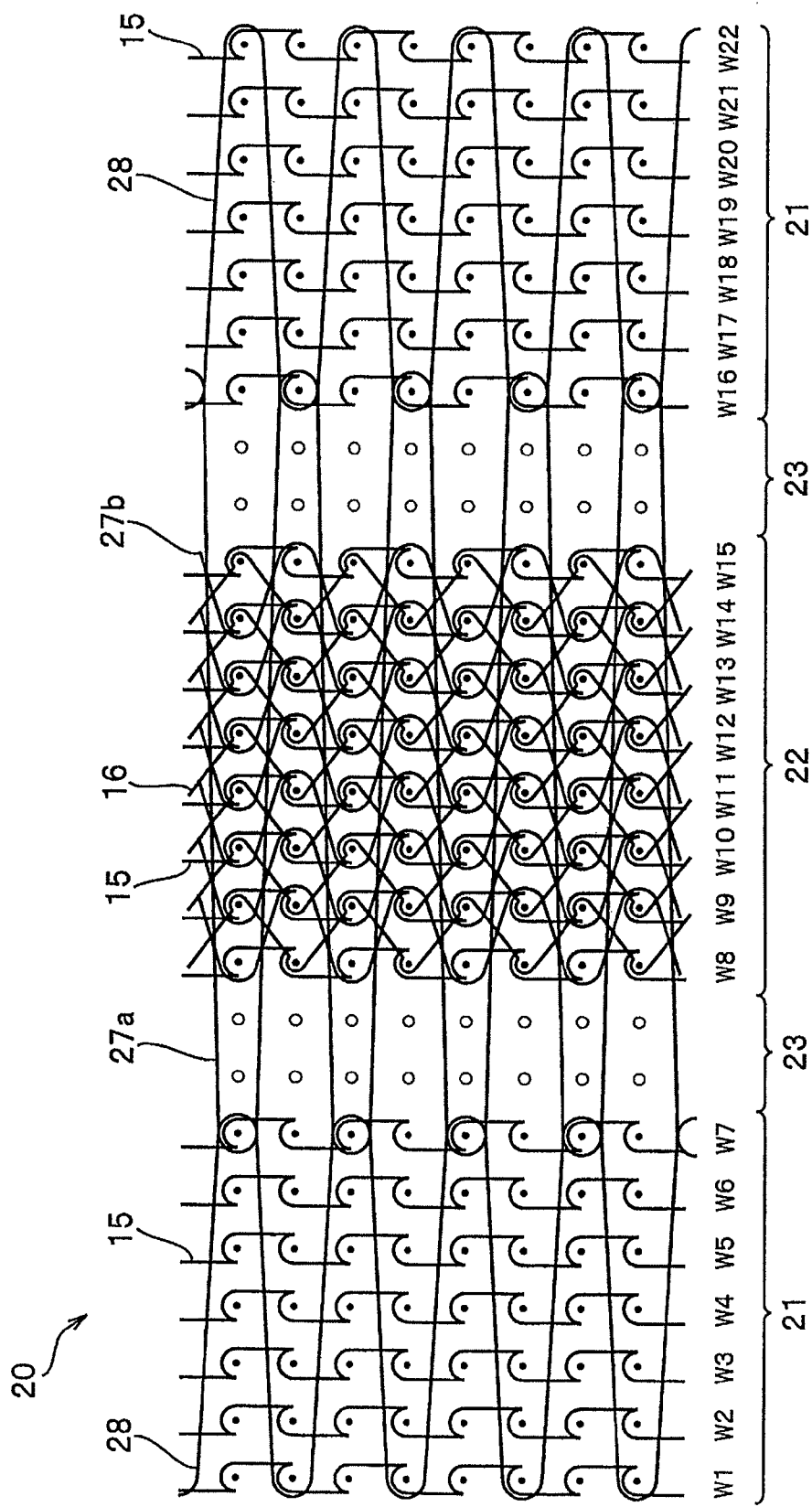
FIG. 6 is a knitting structure view showing warp knitting structure of a knitted surface fastener according to a second embodiment of the invention.
Figure 7:
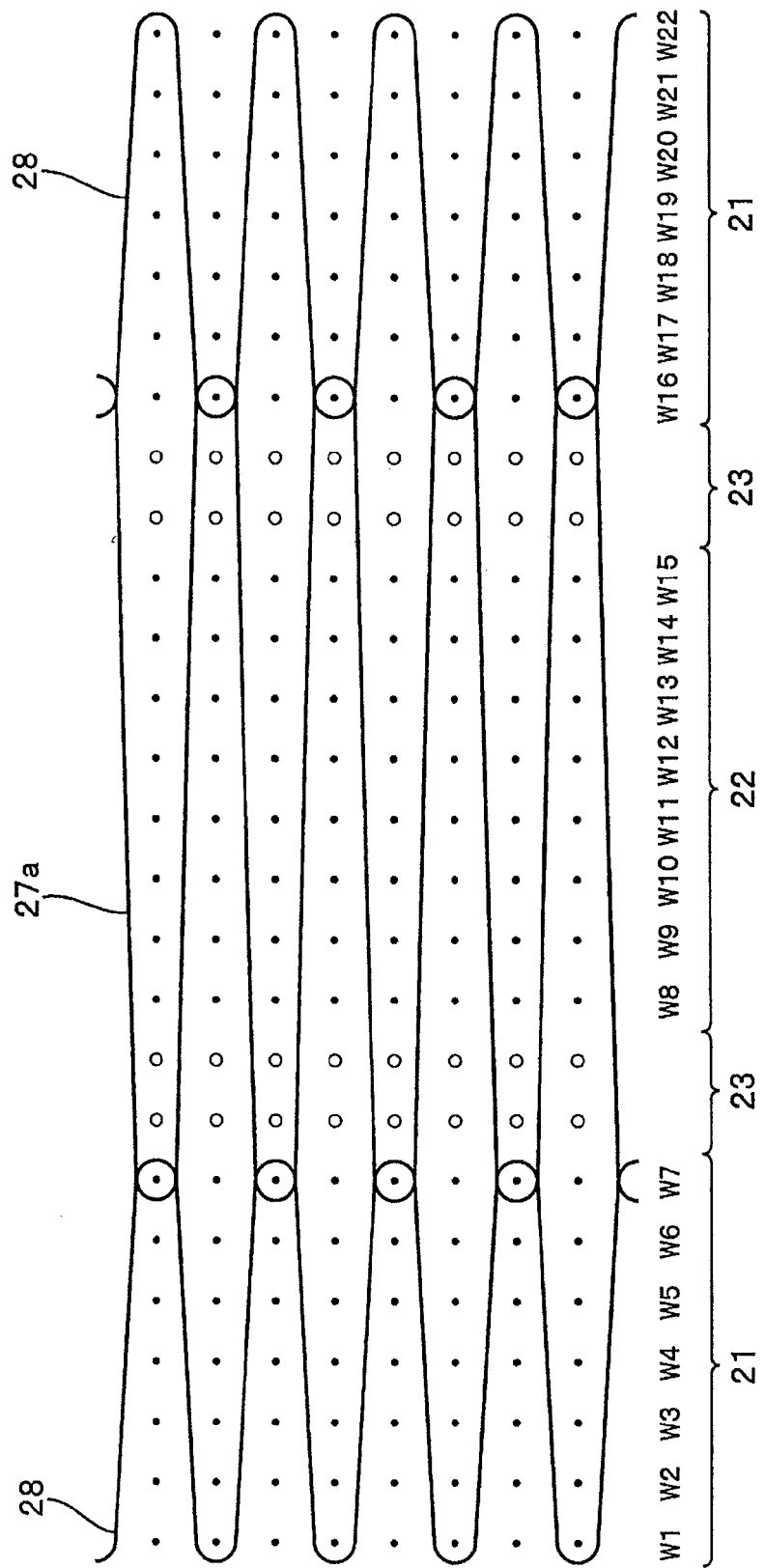
FIG. 7 is a structure diagram of weft insertion yarns utilized in the knitted surface fastener.
Figure 8:
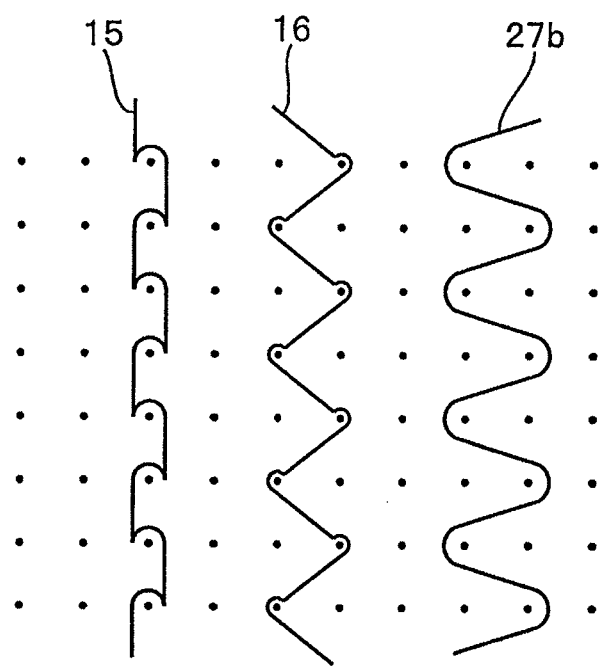
FIG. 8 is a structure diagram of chain knitting yarns, tricot knitting yarns, and weft insertion yarns utilized in the knitted surface fastener.

FIG. 6 is a knitting structure view showing warp knitting structure of a knitted surface fastener according to a second embodiment. FIG. 7 is a structure diagram of weft insertion yarns utilized in the knitted surface fastener, and FIG. 8 is a structure diagram of chain knitting yarns, tricot knitting yarns, and weft insertion yarns utilized in the knitted surface fastener.

Further, in the second embodiment as well as in the third embodiment and the fourth embodiment which will be described later, the same numerals are given to knitting yarns which are knitted substantially in the same way as the knitting yarns as described in the first embodiment and the description thereof will not be repeated.

A knitted surface fastener 20 of the second embodiment includes a surface fastener area 22 having a plurality of loop-shaped female engagement elements, right and left connection areas 23 disposed adjacent to both right and left sides of the surface fastener area 22, and right and left sewn areas 21 disposed adjacent to further outside of the right and left connection areas 23.

Further, the knitted surface fastener 20 of the second embodiment includes wales which are composed of 22 rows of the chain knitting yarns 15. When a wale, which is formed at one side end edge (left side of side end edge) in the knitted surface fastener 20, is stipulated as a first wale W1, and wales from a wale, which adjoins the first wale W1, through a wale, which is formed at the other side end edge (right side of side end edge) in the knitted surface fastener 20, are stipulated as a second wale W2 to a 22nd wale W22 in turns, the surface fastener area 22 is formed by wales from a 8th wale W8 to a 15th wale W15, and right side and left side of the sewn areas 21 are formed by wales from a first wale W1 to a 7th wale W7 and by wales from a 16th wale W16 to a 22nd wale W22, respectively.

Further, the right and left connection areas 23 are composed of only first weft insertion yarns 27a between 14 needles as described later, and wales which are composed of the chain knitting yarns 15 are not formed in the connection area 23. Further in the invention, a position to provide the connection area 23 and a size (width dimension) of the connection area 23 in the knitted surface fastener 20 can be arbitrarily changed according to an intended purpose and the like.

The surface fastener area 22 of the second embodiment is composed of the chain knitting yarns 15 (0-1/1-0) forming each wale, the tricot knitting yarns 16 (0-1/2-1) disposed over two rows of wales adjacent to each other, one first direction first weft insertion yarn 27a striding over the connection area 23 and inserted in zigzags over all wales of the surface fastener area 22 (i.e., the 8th wale W8 to the 15th wale W15) and the innermost wales of the right and left sewn areas 21 (i.e., the 7th wale W7 and the 16th wale W16), and seven first direction first weft insertion yarns 27b (2-2/0-0) inserted in zigzags over two rows of wales in the surface fastener area 22. Further, each tricot knitting yarns 16 of the surface fastener area 22 forms a plurality of loops which become female engagement elements between each wale, as in the case of the first embodiment.

Further, in the second embodiment, since one first weft insertion yarn 27a which strides over the connection area 23 and which are inserted over all wales of the surface fastener area 22 and the innermost wales of the right and left sewn areas 21 is inserted over 14 knitting needles when the knitted surface fastener 20 is knitted by the warp knitting machine, the said one first weft insertion yarn 27a denotes the first weft insertion yarn 27a between 14 needles.

Meanwhile, the seven first weft insertion yarns 27b inserted over two rows of wales in the surface fastener area 22 denote the first weft insertion yarns 27b between two needles for the same reason. In the surface fastener area 22 of the second embodiment, each wale formed by the chain knitting yarns 15 is connected with adjacent wales by the tricot knitting yarns 16 and the first weft insertion yarns 27b between two needles, thereby regulating a space between wales not to become larger than necessary.

In the second embodiment, multi-filament yarns of polyester fiber are utilized for the chain knitting yarns 15, the tricot knitting yarns 16, and two kinds of the first weft insertion yarns 27a between 14 needles and the first weft insertion yarns 27b between two needles having different swing width which form the surface fastener area 22. Further, the first weft insertion yarns 27a between 14 needles and the first weft insertion yarns 27b between two needles have a fineness of ≥110 decitex ≤990 decitex. Especially in the second embodiment, the first weft insertion yarns 27a are comprised in a state of bundling two yarns having a fineness of 330 decitex (i.e., 330 decitex×two yarns), and the first weft insertion yarns 27b are comprised of one yarn having a fineness of 167 decitex (167 decitex×one yarn).

Further, in the second embodiment, by making a fineness of a plurality of the first weft insertion yarns 27b between two needles which are disposed in the surface fastener area 22 small as described above, it is possible to form without loosening needle loops of the chain knitting yarns 15 and the tricot knitting yarns 16 in the surface fastener area 22 in which the respective first weft insertion yarns 27b between two needles are intersected, and thereby the warp knitting structure of the surface fastener area 22 can be stabilized. Further, the needle loops of the tricot knitting yarns 16 being tightened, a feeling of massiveness can be provided for the loop-shaped female engagement elements formed by the tricot knitting yarns 16, so that male engagement elements 9a disposed in the male surface fastener which is an engagement counterpart can be easily hooked on the surface fastener area 22 of the second embodiment.

Each right and left sewn area 21 is composed of the chain knitting yarns 15 (0-1/1-0) which form each wale and one second direction second weft insertion yarn 28 (0-0/8-8) which is inserted in zigzags to a direction intersecting between courses with respect to the first direction first weft insertion yarns 27a between 14 needles and the first direction first weft insertion yarns 27b between two needles over all wales in the sewn areas 21 (i.e., the first wale W1 to the 7th wale W7, or the 16th wale W16 to the 22nd wale W22), respectively.

In this case, the first direction first weft insertion yarns 27a disposed between 14 needles in the surface fastener area 22 and the second direction second weft insertion yarns 28 disposed in each sewn area 21 are interlaced in the same stitches on the 7th wale W7 and the 16th wale W16 which are in the innermost of the right and left sewn areas 21, and are folded in the opposite direction to each other. Therefore, the relative positions of the 7th wale W7 and the 16th wale W16 in the knitted surface fastener 20 are stabilized so that spaces between the right and left sewn areas 21 can be regulated.

In the second embodiment, multi-filament yarns of polyester fiber are utilized for the chain knitting yarns 15, and the second direction second weft insertion yarns 28. Further, the chain knitting yarns 15 disposed in the sewn areas 21 have a same fineness as the chain knitting yarns 15 disposed in the surface fastener area 22.

The second weft insertion yarns 28 disposed in the sewn areas 21 of the second embodiment have a larger fineness than the first weft insertion yarns 27a between 14 needles and the first weft insertion yarns 27b between two needles disposed in the surface fastener area 22, and moreover, have a fineness of ≥167 ≤1320 decitex. In particular, the second weft insertion yarns 28 of the second embodiment are comprised in a state of bundling two yarns having a fineness of 300 decitex per one yarn (i.e., 300 decitex.times.two yarns). Namely, an average weight of the second weft insertion yarns 28 per unit area disposed in the sewn areas 21 is set to be larger than an average weight of the first weft insertion yarns 27a and 27b per unit area disposed in the surface fastener area 22 of the second embodiment.

In this way, by making a fineness of the second weft insertion yarns 28 disposed in the sewn areas 21 larger than that of the two kinds of the first weft insertion yarns 27a and 27b disposed in the surface fastener area 22, it is possible to form the warp knitting structure of the sewn areas 21 firmly so that positional shifts of stitches in the sewn areas 21 can be hardly generated.

The right and left connection areas 23 which connect between the surface fastener area 22 and the right and left sewn areas 21 are composed of only the first weft insertion yarns 27a between 14 needles which are inserted in the surface fastener area 22, and neither the chain knitting yarns 15 nor the tricot knitting yarns 16 are knitted.

Such a female knitted surface fastener 20 of the second embodiment, as in the case of the female knitted surface fastener 20 of the first embodiment described above, is utilized as a fastening member to fasten the cover material 2 to the cushion member 3 in the vehicle-use seat 1.

In the knitted surface fastener 20 of the second embodiment, since the first weft insertion yarns 27a between 14 needles and the first weft insertion yarns 27b between two needles which are disposed in the surface fastener area 22 have a smaller fineness than the second weft insertion yarns 28 which are disposed in the sewn areas 21, as in the case of the female knitted surface fastener 10 in the first embodiment described above, it is possible to enhance flexibility of the surface fastener area 22 while ensuring stable engaging force of the surface fastener area 22, so that weight reduction of the whole knitted surface fastener 20 and production costs reduction by reduction of unit requirement can be achieved.

Further, in the knitted surface fastener 20 of the second embodiment, since neither the first weft insertion yarns 27a nor the second weft insertion yarns 28 are inserted over the whole width of the knitted surface fastener 20, both of which are inserted over some parts of a plurality of rows of wales out of all rows of wales which comprise the knitted surface fastener 20, it is possible to efficiently carry out the knitting process of the knitted surface fastener 20 so as to enhance productivity (production efficiency) of the knitted surface fastener 20.

In addition, in the knitted surface fastener 20 of the second embodiment, by making the second weft insertion yarns 28 which are disposed in the sewn areas 21 thicker than the first weft insertion yarns 27a between 14 needles and the first weft insertion yarns 27b between two needles which are disposed in the surface fastener area 22, as in the case of the knitted surface fastener 10 in the first embodiment described above, when the knitted surface fastener 20 is knitted, due to the small tension force of the chain knitting yarns 15 in the sewn areas 21, collapsing the shapes (knitting collapse) of the chain knitting which are knitted in the sewn areas 21 and causing weft insertion yarns which are inserted in the sewn areas 21 to become loose can be prevented, so that it is possible to knit the knitted surface fastener 20 smoothly. In addition, it is also possible to perform conveying operation by the conveying roller and winding operation at the winding portion smoothly.

Furthermore, since the knitted surface fastener 20 of the second embodiment has a connection area 23 in which neither the chain knitting yarns 15 nor the tricot knitting yarns 16 between the surface fastener area 22 and the right and left sewn areas 21 are disposed, it is possible to obtain effect of achieving weight reduction of the knitted surface fastener 20 greatly by reducing the whole usage amount of knitting yarns required for knitting the knitted surface fastener 20 and effect of achieving further production costs (especially, material costs) reduction of the knitted surface fastener 20 by great reduction of unit requirement of the knitted surface fastener 20.

Further, the connection area 23 being disposed in the knitted surface fastener 20 of the second embodiment, the whole surface fastener area 22, in which each wale are connected by the tricot knitting yarns 16 and the first weft insertion yarns 27b between two needles, can be moved to the right and left directions between the right and left sewn areas 21, so that a relative position in the right and left directions of the surface fastener area 22 in the knitted surface fastener 20 can be easily adjusted.

Therefore, even in a case that a more or less error occurs in the dimension of the cover material 2, for example, when the knitted surface fastener 20 of the second embodiment is attached to the cover material 2 of the vehicle-use seat 1 (See FIG. 5), the position of the surface fastener area 22 with respect to the cover material 2 can be adjusted easily, so that the female engagement elements of the knitted surface fastener 20 can be disposed at the tip of the end part of the cover pieces 2a stably.

Further, since the surface fastener area 22 at this time is fixed so as not to cause misalignment by the first weft insertion yarns 27b between two needles, the relative position of the surface fastener area 22 can be adjusted stably. Further, any structure can be used for the first weft insertion yarns 27b between two needles, as long as the first weft insertion yarns 27b between two needles connect misalignment of the surface fastener area 22, particularly connect the chain knitting yarns 15 to each other which adjoin so as not to expand loop intervals mutually.

(Third Embodiment)

Figure 9:
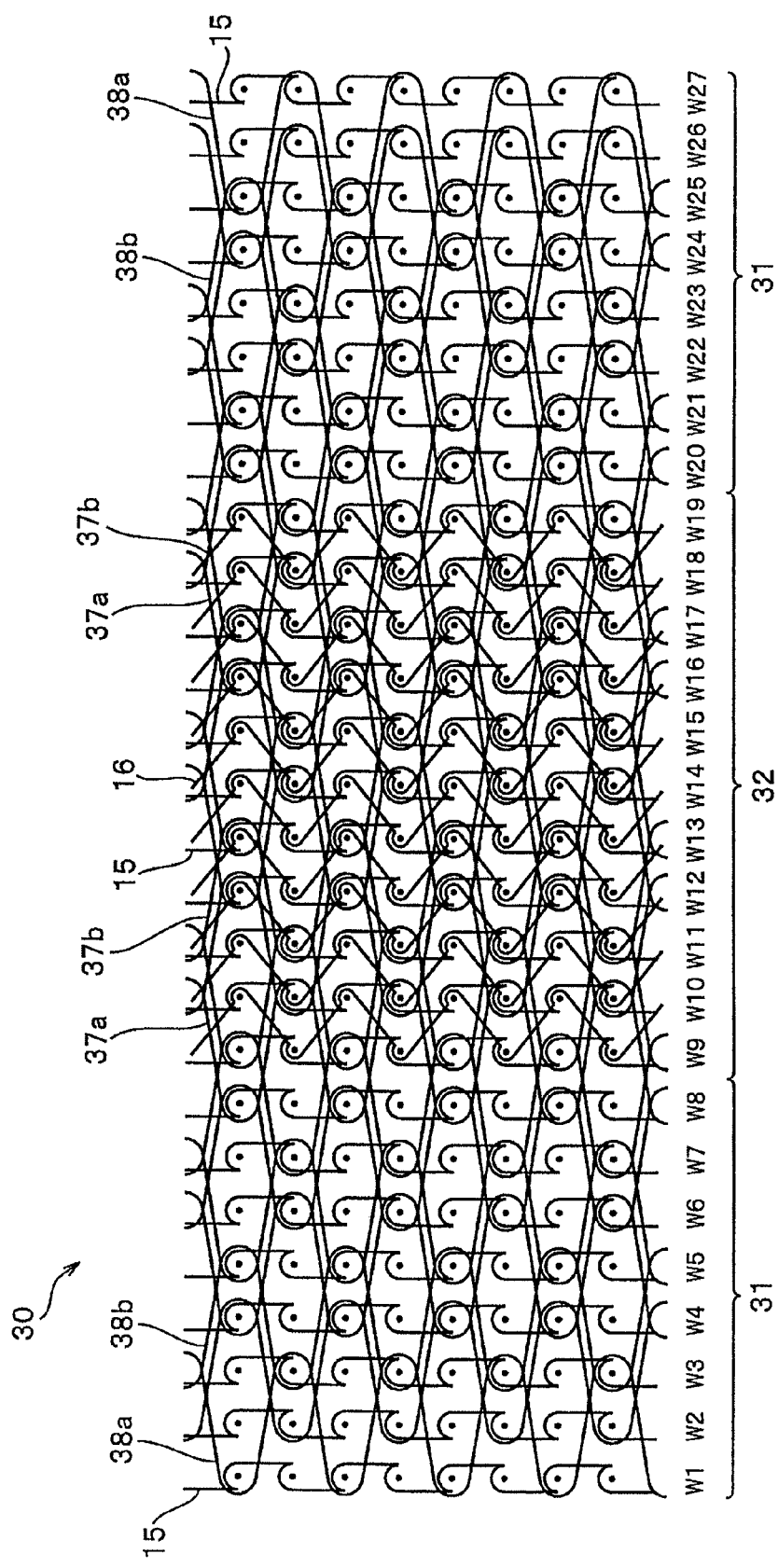
FIG. 9 is a knitting structure view showing warp knitting structure of a knitted surface fastener according to a third embodiment of the invention.
Figure 10:
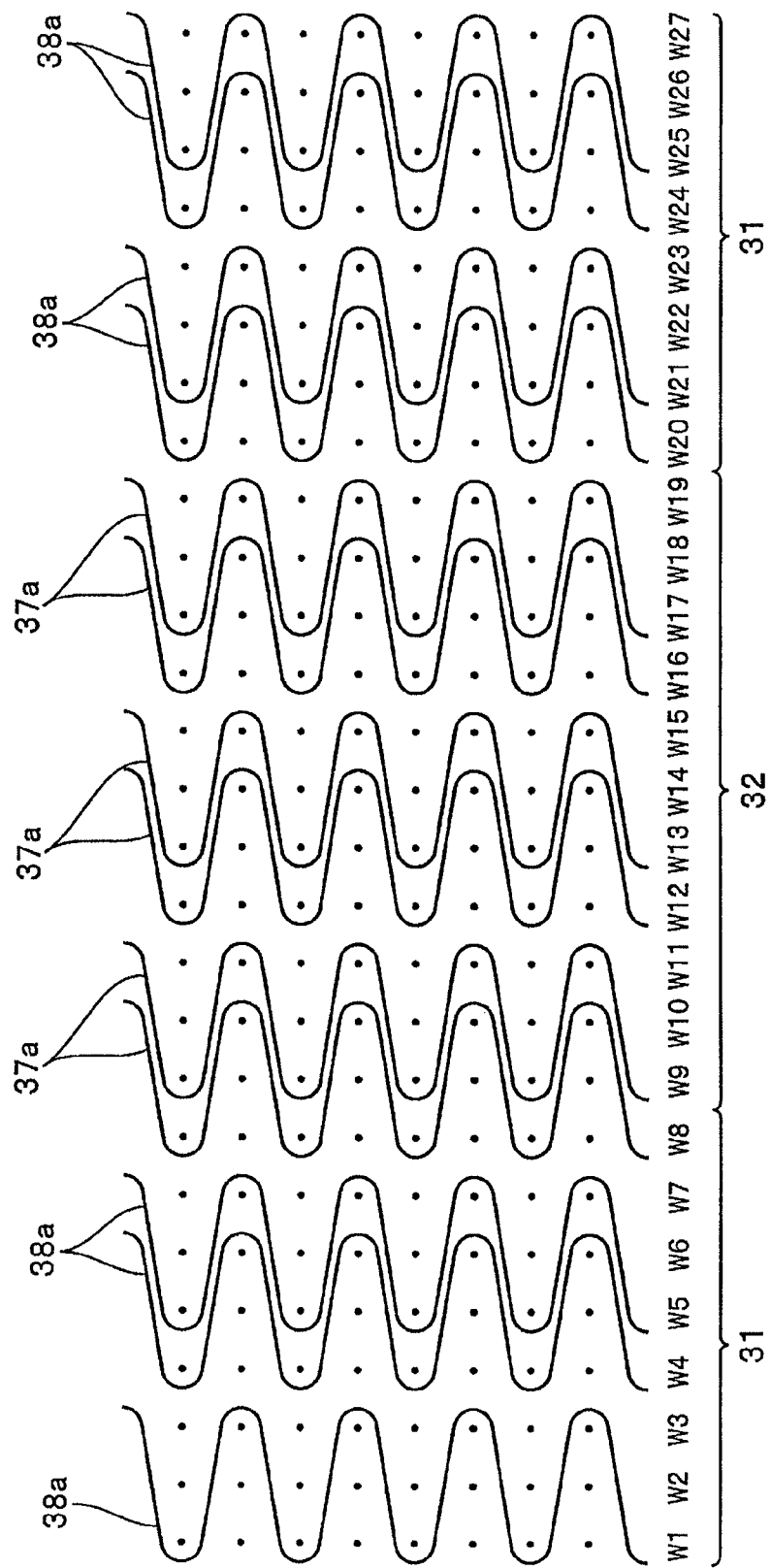
FIG. 10 is a structure diagram of first direction weft insertion yarns utilized in the knitted surface fastener.
Figure 11:
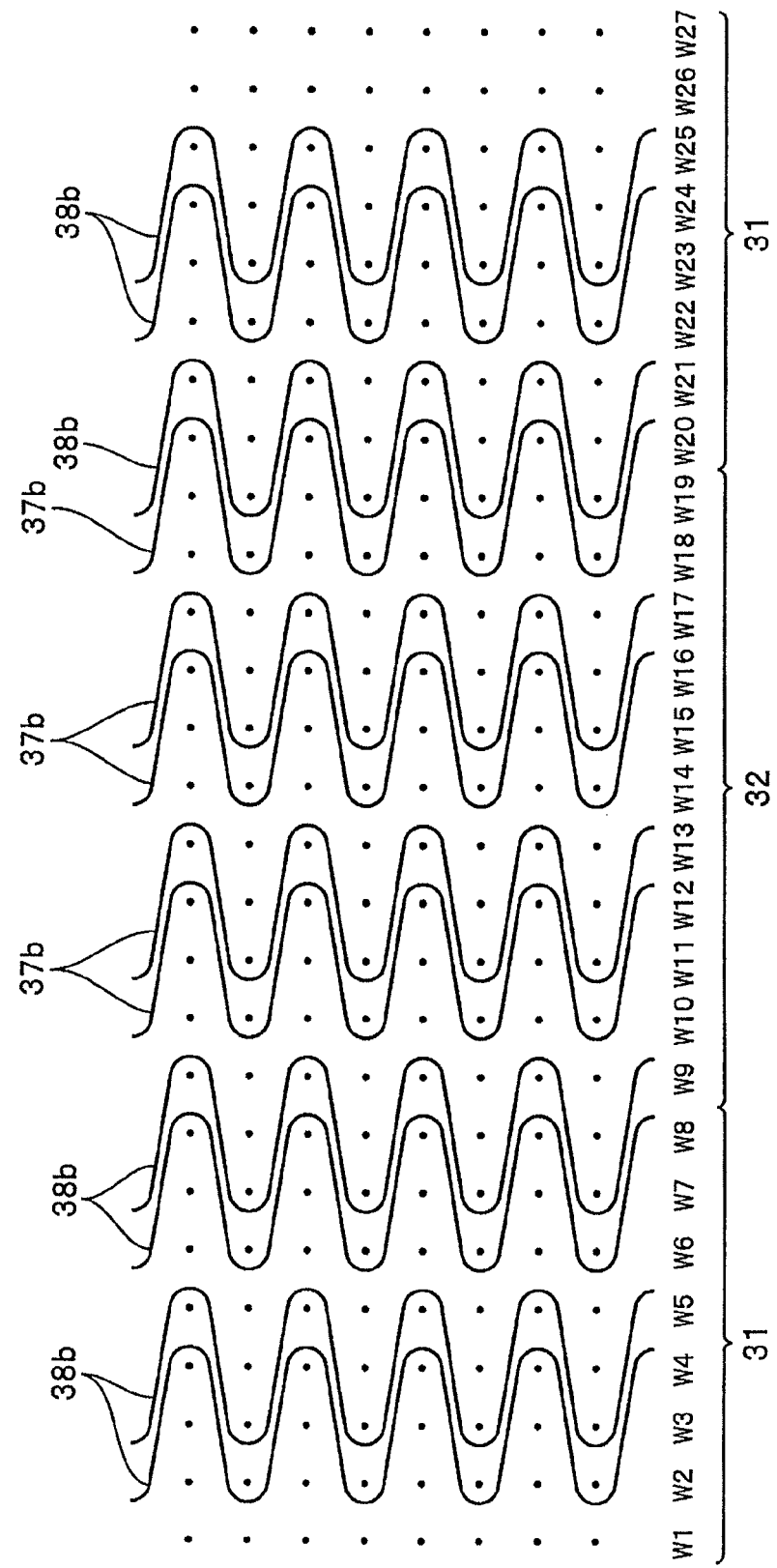
FIG. 11 is a structure diagram of second direction weft insertion yarns utilized in the knitted surface fastener.
Figure 12:
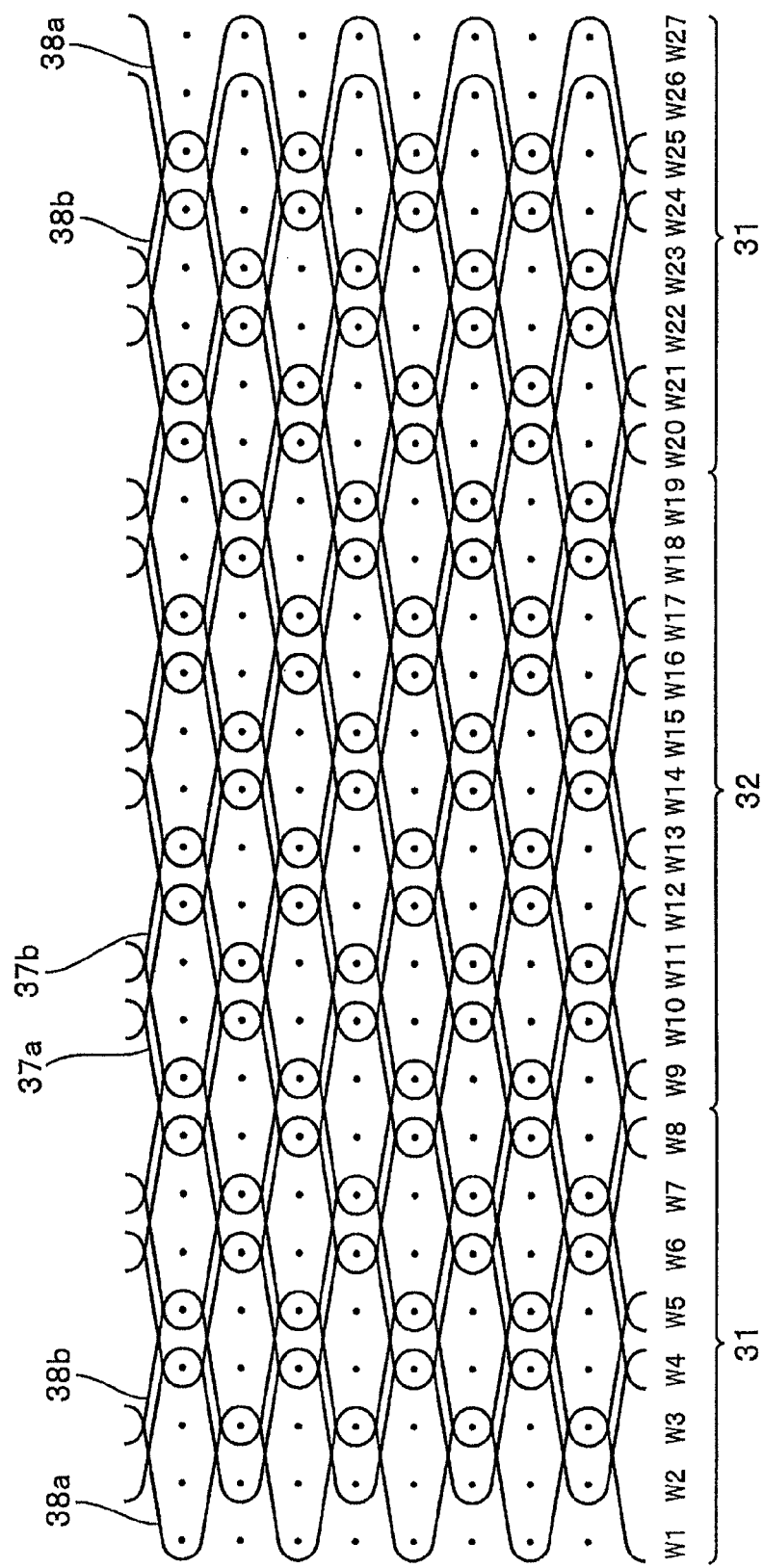
FIG. 12 is a structure diagram of first direction and second direction weft insertion yarns utilized in the knitted surface fastener.

FIG. 9 is a knitting structure view showing warp knitting structure of a knitted surface fastener according to a third embodiment of the invention. FIG. 10 is a structure diagram of first direction weft insertion yarns utilized in the knitted surface fastener and FIG. 11 is a structure diagram of second direction weft insertion yarns utilized in the knitted surface fastener. Further, FIG. 12 is a structure diagram of first direction and second direction weft insertion yarns utilized in the knitted surface fastener.

A knitted surface fastener 30 of the third embodiment includes a surface fastener area 32 having a plurality of loop-shaped female engagement elements, and right and left sewn areas 31 disposed adjacent to both right and left sides of the surface fastener area 32.

Further, the knitted surface fastener 30 of the third embodiment includes wales which are composed of 27 rows of the chain knitting yarns 15. When a wale, which is formed at one side end edge (left side of side end edge) in the knitted surface fastener 30, is stipulated as a first wale W1, and wales from a wale, which adjoins the first wale W1, to a wale, which is formed at the other side end edge (right side of side end edge) in the knitted surface fastener 30, are stipulated as a second wale W2 to a 27th wale W27 in turns, the surface fastener area 32 is formed by wales from a 9th wale W9 to a 19th wale W19, and a right side and a left side of the sewn areas 31 are formed by wales from a first wale W1 to a 8th wale W8 and by wales from a 20th wale W20 to a 27th wale W27, respectively.

The surface fastener area 32 of the third embodiment is composed of the chain knitting yarns 15 (0-1/1-0) forming each wale, the tricot knitting yarns 16 (0-1/2-1) disposed over two rows of wales adjacent to each other, first direction first weft insertion yarns 37a (3-3/0-0) inserted in zigzags over three rows of wales in the surface fastener area 32, and second direction first weft insertion yarns 37b (0-0/3-3) inserted in zigzags to a direction of intersecting between courses with the first direction first weft insertion yarns 37a over three rows of wales in the surface fastener area 32.

In the third embodiment, multi-filament yarns of polyester fiber are utilized for the chain knitting yarns 15, the tricot knitting yarns 16, the first direction first weft insertion yarns 37a, and the second direction first weft insertion yarns 37b which form the surface fastener area 32. Further, both the first direction first weft insertion yarns 37a and the second direction first weft insertion yarns 37b have a fineness ≧110 decitex ≦330 decitex, especially in the third embodiment, both the first weft insertion yarns 37a and 37b are composed of one yarn having a fineness of 167 decitex (167 decitex×one yarn).

Further, in the third embodiment, by making a fineness of a plurality of the first direction first weft insertion yarns 37a and the second direction first weft insertion yarns 37b which are disposed in the surface fastener area 32 small as described above, it is possible to form without loosening needle loops of the chain knitting yarns 15 and the tricot knitting yarns 16 in the surface fastener area 32 in which the respective first weft insertion yarns 37a are intersected, and thereby the warp knitting structure of the surface fastener area 32 can be stabilized. Further, the needle loops of the tricot knitting yarns 16 being tightened, a feeling of massiveness can be provided for the loop-shaped female engagement elements formed by the tricot knitting yarns 16, so that male engagement elements disposed in the male surface fastener, which is an engagement counterpart, can be easily hooked on the surface fastener area 32 of the third embodiment.

Each right and left sewn area 31 is composed of the chain knitting yarns 15 (0-1/1-0) forming each wale, first direction second weft insertion yarns 38a (3-3/0-0) inserted in zigzags over three rows of wales in the sewn areas 31, and second direction second weft insertion yarns 38b (0-0/3-3) inserted in zigzags to a direction of intersecting between courses with the first direction second weft insertion yarns 38a over three rows of wales in the sewn areas 31.

Further, in the knitted surface fastener 30 of the third embodiment, in the warp knitting structure of the surface fastener area 32 and the right and left sewn areas 31, the first direction first weft insertion yarns 37a and the first direction second weft insertion yarns 38a as well as the second direction first weft insertion yarns 37b and the second direction second weft insertion yarns 38b are inserted regularly to have the same swing width to each other (in other words, to have the same number of the rows of wales in which the first direction first weft insertion yarns 37a and the first direction second weft insertion yarns 38a as well as the second direction first weft insertion yarns 37b and the second direction second weft insertion yarns 38b are inserted) so that stitches on a wale, in which the first direction first weft insertion yarns 37a or the first direction second weft insertion yarns 38a as well as the second direction first weft insertion yarns 37b or the second direction second weft insertion yarns 38b are concurrently interlaced into a same course and are folded in the opposite direction to each other, are disposed diagonally. (See FIGS. 10 to 12).

Accordingly, it is possible to make the thickness of the knitted surface fastener 30 in the surface fastener area 32 and in the right and left sewn areas 31 thick, and to form the warp knitting structure of the knitted surface fastener 30 firmly as a whole so as to prevent positional shifts of stitches in the surface fastener area 32 and in the right and left sewn areas 31 to a right and left direction. Therefore, it is possible to stably hold the warp knitting structure of the knitted surface fastener 30 for a long period of time. In addition, since the first direction first weft insertion yarns 37a and the first direction second weft insertion yarns 38a as well as the second direction first weft insertion yarns 37b and the second direction second weft insertion yarns 38b are effectively and efficiently disposed in the surface fastener area 32 and in the right and left sewn areas 31, a used amount of the weft insertion yarns used for the knitted surface fastener 30 and weight increase of the knitted surface fastener 30 are suppressed.

Further, in the knitted surface fastener 30 of the invention, if it is possible to diagonally dispose the stitches on a wale in which the first direction first weft insertion yarns 37a or the first direction second weft insertion yarns 38a as well as the second direction first weft insertion yarns 37b or the second direction second weft insertion yarns 38b are concurrently interlaced into a same course and are folded in the opposite direction to each other, it is also possible to insert the first direction first weft insertion yarns 37a and the first direction second weft insertion yarns 38a as well as the second direction first weft insertion yarns 37b and the second direction second weft insertion yarns 38b in zigzags over four rows, or five or more rows of wales.

In this case, taking account of production efficiency and production speed of the knitted surface fastener 30 by the warp knitting machine, it is preferable to set the number of wales, in which each first weft insertion yarn 37a and 37b and each second weft insertion yarn 38a and 38b are inserted, to be 15 or less, particularly 10 or less. In addition, taking account of the thickness or the like of the obtained knitted surface fastener 30 as well, it is preferable that each first weft insertion yarn 37a and 37b as well as each second weft insertion yarn 38a and 38b are inserted in zigzags over three rows or four rows of wales.

In the third embodiment, multi-filament yarns of polyester fiber are utilized for the chain knitting yarns 15, the first direction second weft insertion yarns 38a, and the second direction second weft insertion yarns 38b which form the sewn areas 31. Further, the chain knitting yarns 15 disposed in the sewn areas 31 have the same fineness as the chain knitting yarns 15 disposed in the surface fastener area 32.

Meanwhile, the first direction second weft insertion yarns 38a and the second direction second weft insertion yarns 38b have a larger fineness than the first direction first weft insertion yarns 37a and the second direction first weft insertion yarns 37b disposed in the surface fastener area 32, and moreover, have a fineness of $\geq 167$ decitex $\leq 660$ decitex. In particular, the first direction second weft insertion yarns 38a and the second direction second weft insertion yarns 38b of the third embodiment are composed of one yarn having a fineness of 300 decitex (300 decitex.times.one yarn). Namely, an average weight of the first direction second weft insertion yarns 38a and the second direction second weft insertion yarns 38b per unit area disposed in the sewn areas 31 is set to be larger than an average weight of the first direction first weft insertion yarns 37a and the second direction first weft insertion yarns 37b per unit area disposed in the surface fastener area 32 of the third embodiment.

In this way, by making a fineness of the first direction second weft insertion yarns 38a and the second direction second weft insertion yarns 38b disposed in the sewn areas 31 larger than that of the first direction first weft insertion yarns 37a and the second direction first weft insertion yarns 37b disposed in the surface fastener area 32, it is possible to further firmly form the warp knitting structure of the sewn areas 31 and hardly generate positional shifts of stitches in the sewn areas 31.

Such a female knitted surface fastener 30 of the third embodiment, as in the cases of the knitted surface fasteners 10 and 20 of the first and the second embodiments described above, is utilized as the fastening member to fasten the cover material 2 to the cushion member 3 in the vehicle-use seat 1.

In the knitted surface fastener 30 of the third embodiment, since the first direction first weft insertion yarns 37a and the second direction first weft insertion yarns 37b which are disposed in the surface fastener area 32 have a smaller fineness than the first direction second weft insertion yarns 38a and the second direction second weft insertion yarns 38b which are disposed in the sewn areas 31, as in the cases of the knitted surface fasteners 10 and 20 of the first and the second embodiments described above, it is possible to enhance flexibility of the surface fastener area 32 while ensuring stable engaging force of the surface fastener area 32, and to achieve weight reduction of the whole knitted surface fastener 30 as well as production costs reduction by reduction of unit requirement.

Further in the female knitted surface fastener 30 of the third embodiment, the first direction first weft insertion yarns 37a and the first direction second weft insertion yarns 38a as well as the second direction first weft insertion yarns 37b and the second direction second weft insertion yarns 38b are inserted in zigzags over three rows of wales, and the swing width of each weft insertion yarn (the number of rows of inserted wales) is made further smaller than that of the first weft insertion yarns 17 and the second weft insertion yarns 18 of the knitted surface fastener 10 in the first embodiment described above. Therefore, it is possible to further efficiently carry out the knitting process of the knitted surface fastener 30 by the warp knitting machine, compared to the knitted surface fastener 10 of the first embodiment described above, and to further enhance productivity (production efficiency) of the knitted surface fastener 30.

In addition, in the knitted surface fastener 30 of the third embodiment, by making the first direction second weft insertion yarns 38a and the second direction second weft insertion yarns 38b disposed in the sewn areas 31 thicker than the first direction first weft insertion yarns 37a and the second direction first weft insertion yarns 37b disposed in the surface fastener area 32, as in the cases of the knitted surface fasteners 10 and 20 in the first and the second embodiments described above, when the knitted surface fastener 30 is knitted due to the small tension force of the chain knitting yarns 15 in the sewn areas 31, collapsing the shapes (knitting collapse) of the chain knitting which are knitted in the sewn areas 31 and causing weft insertion yarns which are inserted in the sewn areas 31 to become loose can be prevented. Further, it is also possible to smoothly perform conveying operation by the conveying roller and winding operation at the winding portion.

(Fourth Embodiment)

Figure 13:
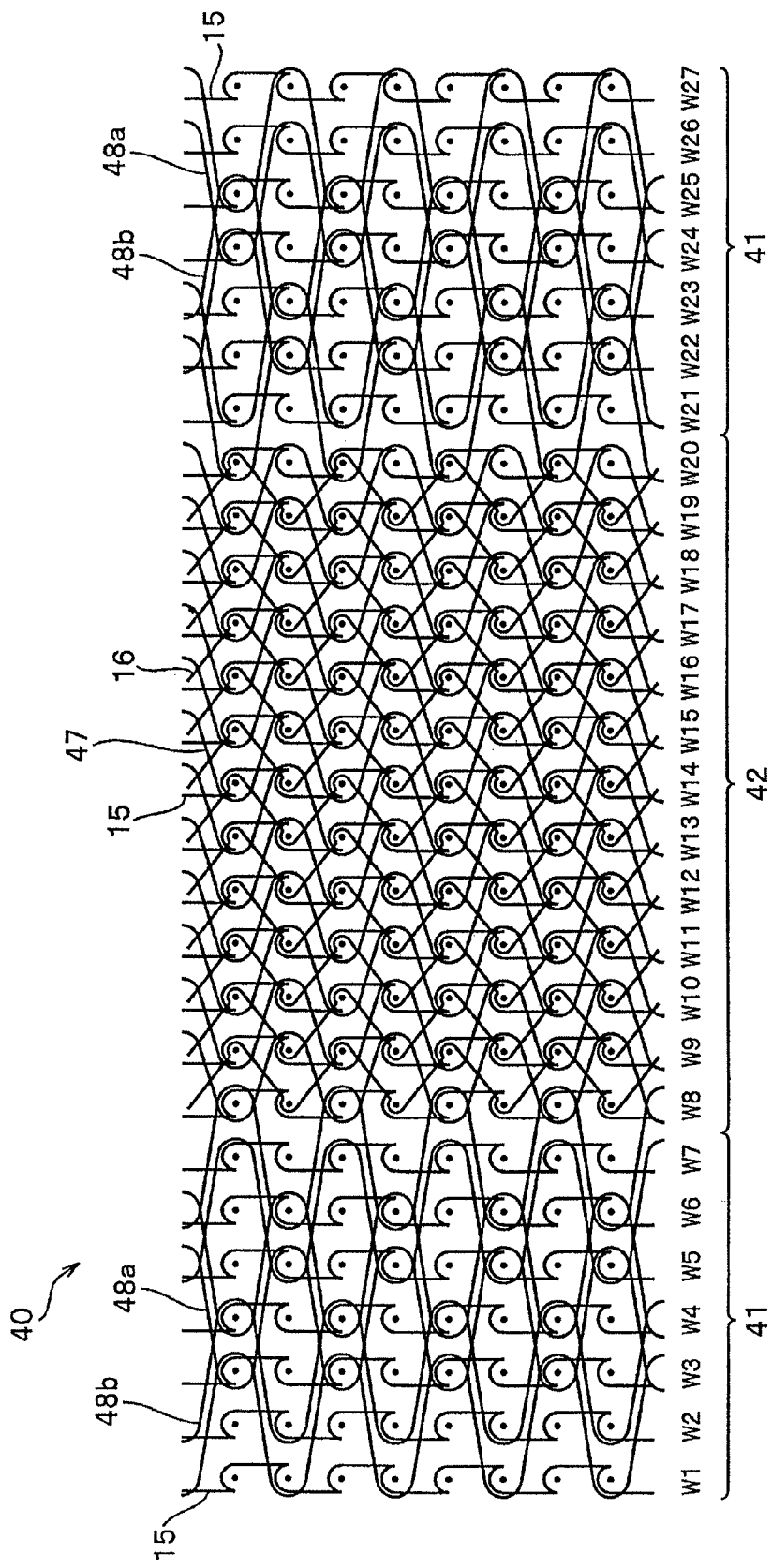
FIG. 13 is a knitting structure view showing warp knitting structure of a knitted surface fastener according to a fourth embodiment of the invention.
Figure 14:
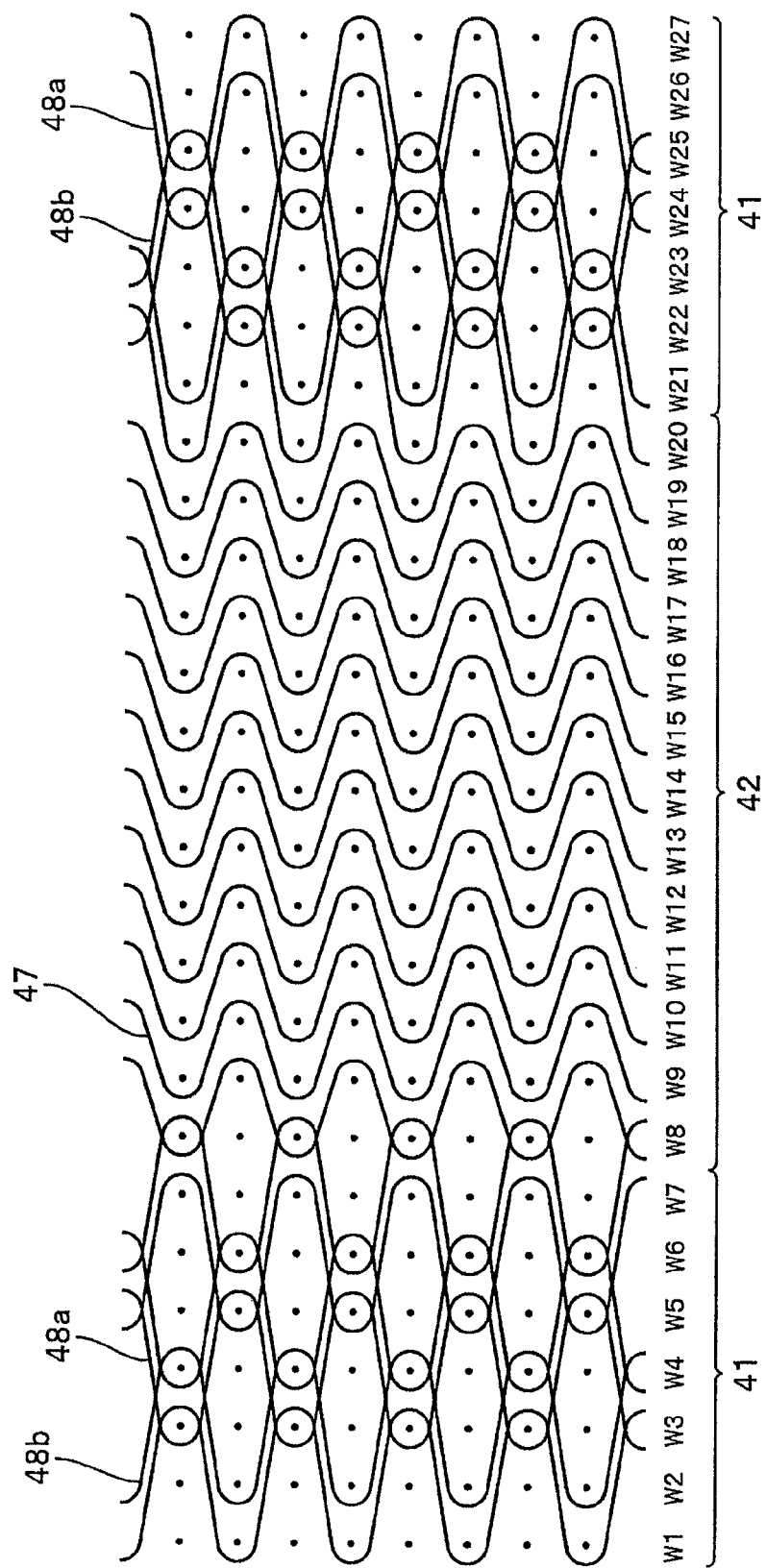
FIG. 14 is a structure diagram of weft insertion yarns utilized in the knitted surface fastener.
Figure 15:
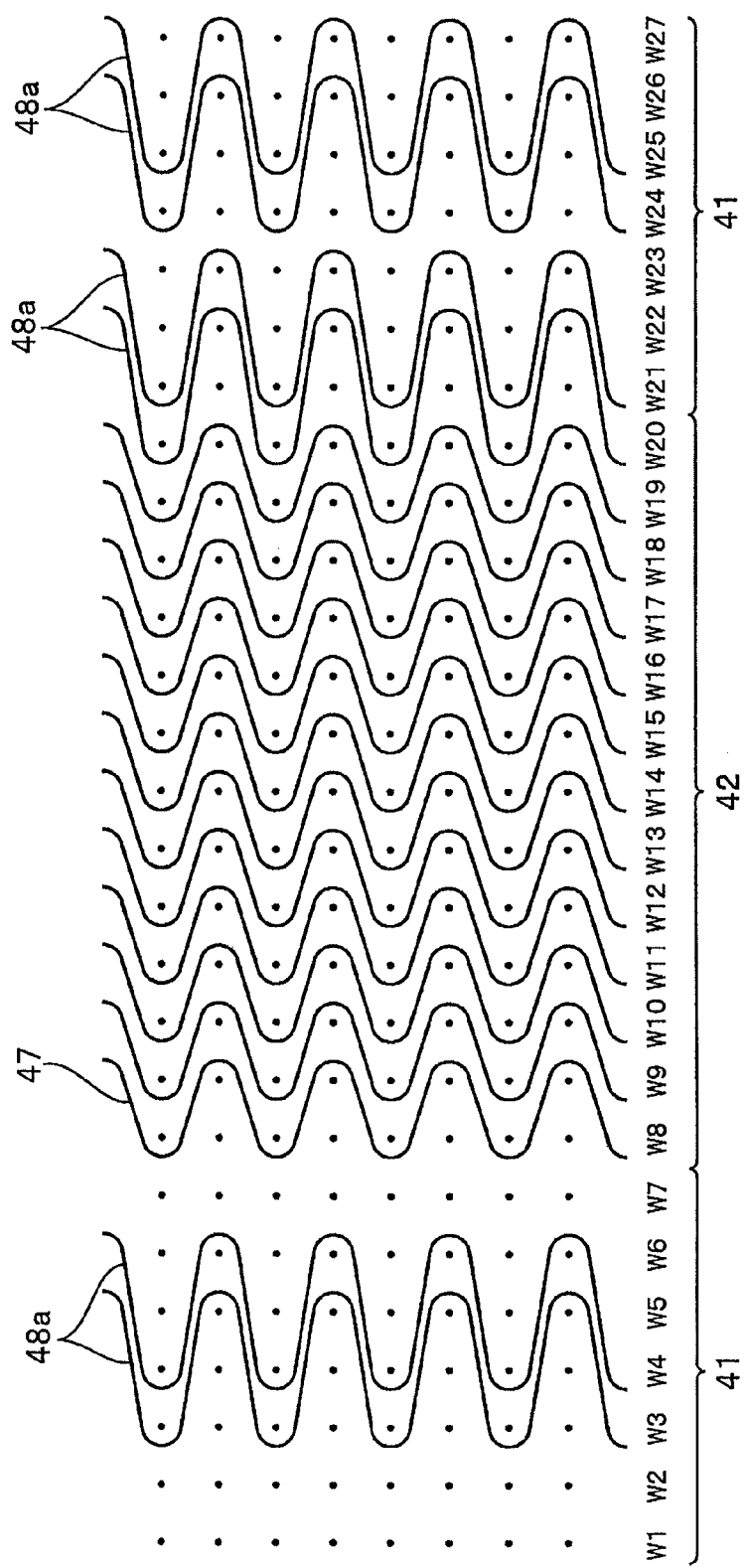
FIG. 15 is a structure diagram of first direction weft insertion yarns utilized in the knitted surface fastener.
Figure 16:
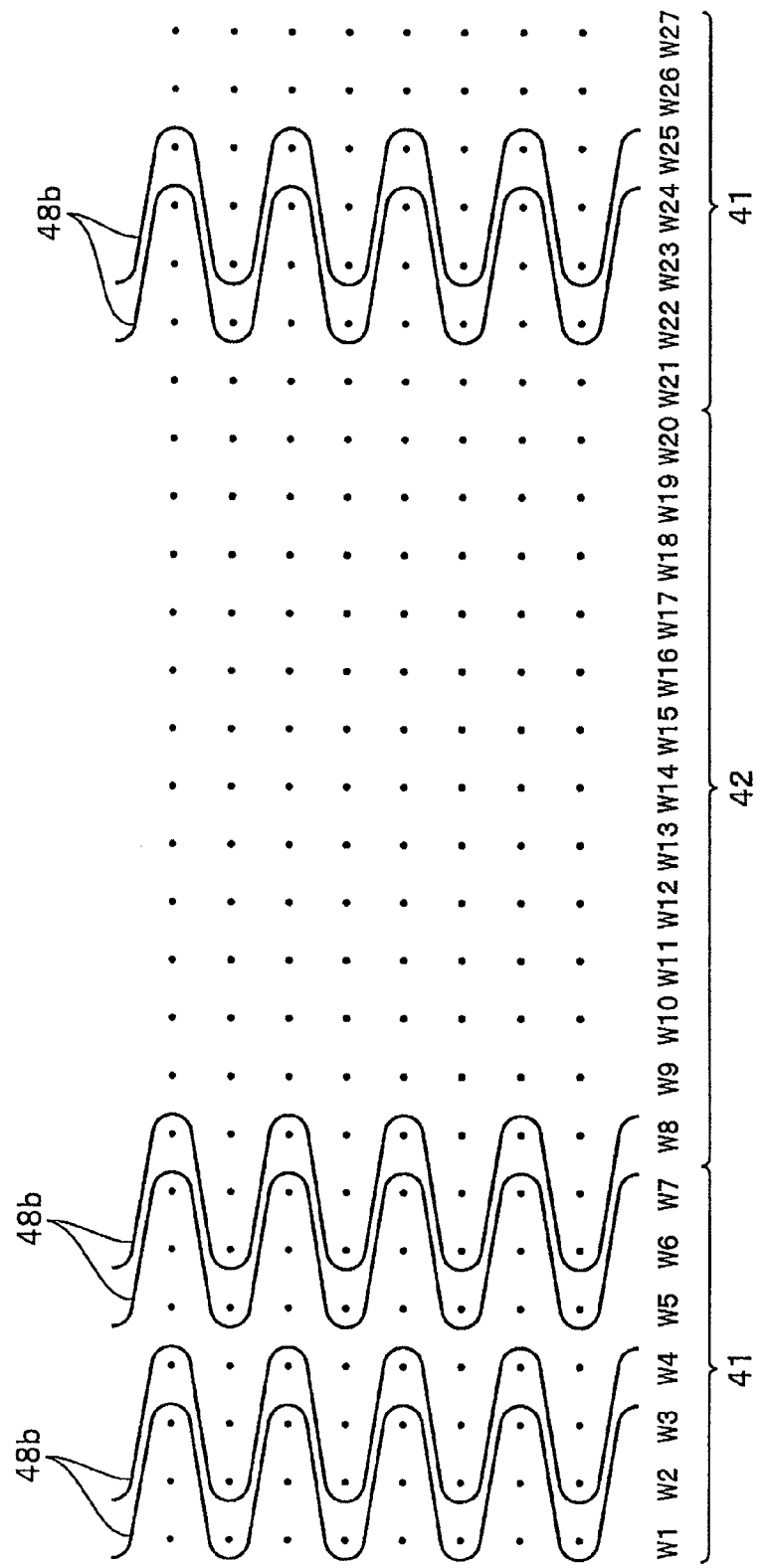
FIG. 16 is a structure diagram of second direction weft insertion yarns utilized in the knitted surface fastener.
Figure 17:
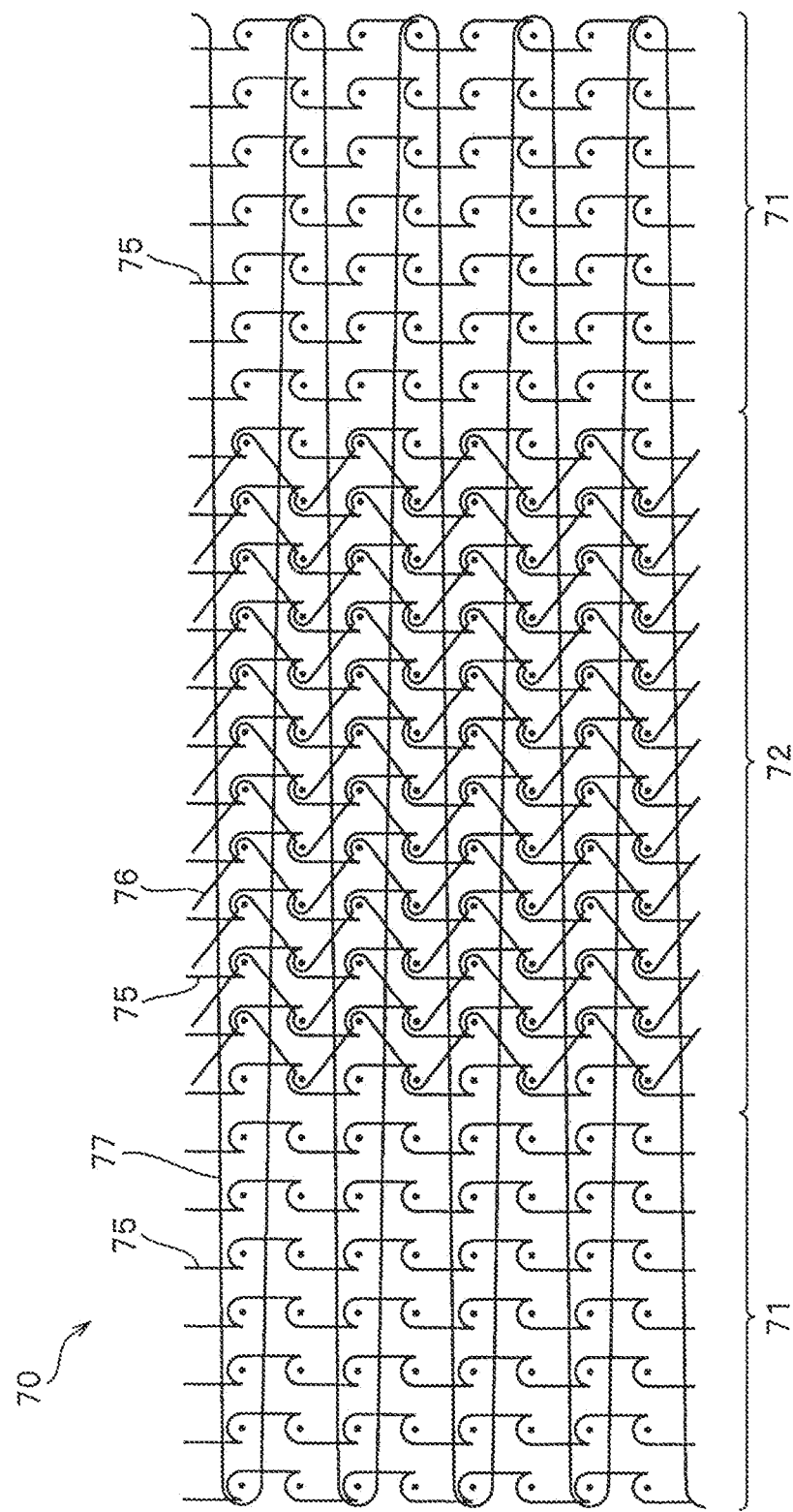
FIG. 17 is a knitting structure view showing warp knitting structure of a conventional knitting surface fastener.
Figure 18:
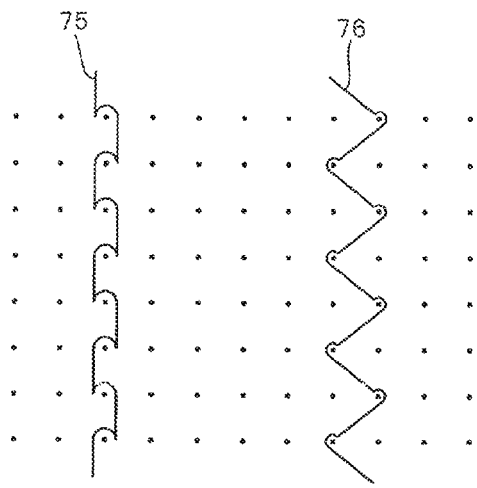
FIG. 18 is a structure diagram of chain knitting yarns and tricot knitting yarns utilized in the knitted surface fastener.
Figure 19:
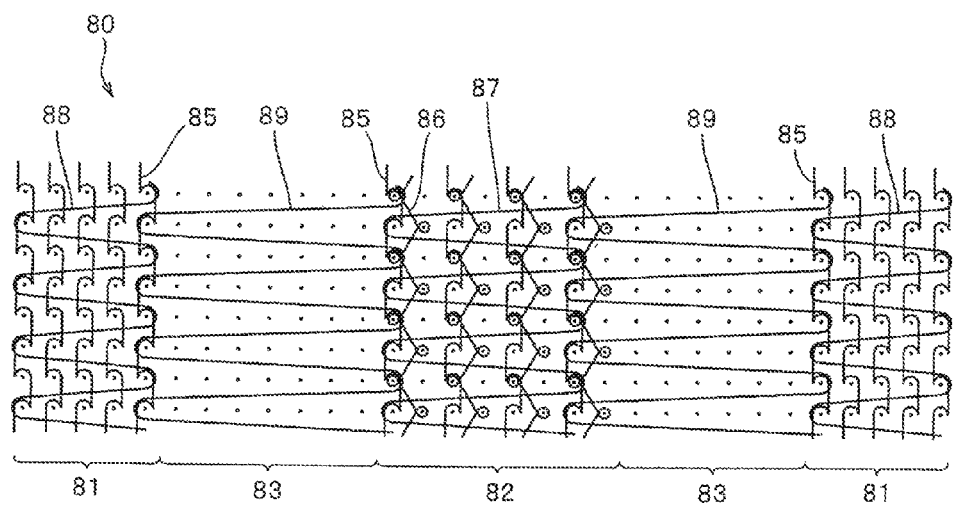
FIG. 19 is a knitting structure view showing warp knitting structure of another conventional knitted surface fastener (a fastening member).

FIG. 13 is a knitting structure view showing warp knitting structure of a knitted surface fastener according to a fourth embodiment of the invention and FIG. 14 is a structure diagram of weft insertion yarns utilized in the knitted surface fastener. Further, FIG. 15 is a structure diagram of first direction weft insertion yarns utilized in the knitted surface fastener and FIG. 16 is a structure diagram of second direction weft insertion yarns utilized in the knitted surface fastener.

A knitted surface fastener 40 of the fourth embodiment includes a surface fastener area 42 having a plurality of loop-shaped female engagement elements, and right and left sewn areas 41 disposed adjacent to both right and left sides of the surface fastener area 42.

Further, although the knitted surface fastener 40 of the fourth embodiment includes wales which are composed of 27 rows of the chain knitting yarns 15 as in the case of the knitted surface fastener 30 in the third embodiment described above, the surface fastener area 42 of this knitted surface fastener 40 is formed by the 8th wale W8 to the 20th wale W20, a right side and a left side of the sewn areas 41 are formed by the first wale W1 to the 7th wale W7 as well as the 21st wale W21 to the 27th wale W27.

The surface fastener area 42 of the fourth embodiment is composed of the chain knitting yarns 15 (0-1/1-0) forming each wale, the tricot knitting yarns 16 (0-1/2-1) disposed over two rows of wales adjacent to each other, and first direction first weft insertion yarns 47 (2-2/0-0) inserted in zigzags over two rows of wales in the surface fastener area 42.

In the fourth embodiment, multi-filament yarns of polyester fiber are utilized for the chain knitting yarns 15, the tricot knitting yarns 16, and the first weft insertion yarns 47 which form the surface fastener area 42. Further, the first weft insertion yarns 47 have a fineness ≥110 decitex ≤330 decitex, and are composed of one yarn having a fineness of 167 decitex (167 decitex×one yarn) especially in the fourth embodiment.

Each right and left sewn area 41 is composed of the chain knitting yarns 15 (0-1/1-0) forming each wale, first direction second weft insertion yarns 48a (3-3/0-0) inserted in zigzags over three rows of wales in the sewn areas 41, and second direction second weft insertion yarns 48b (0-0/3-3) inserted in zigzags to a direction of intersecting between courses with the first direction first weft insertion yarns 47 over three rows of wales in the sewn areas 41.

In this case, in the warp knitting structure of the sewn areas 41, the first direction second weft insertion yarns 48a and the second direction second weft insertion yarns 48b are inserted regularly to have the same swing width to each other so that stitches on a wale, in which the first direction second weft insertion yarns 48a and the second direction second weft insertion yarns 48b are concurrently interlaced and are folded in the opposite direction to each other, are disposed diagonally.

Accordingly, it is possible to make the thickness of the knitted surface fastener 40 in the right and left sewn areas 41 thick, and to form the warp knitting structure of the sewn areas 41 firmly so as to prevent positional shifts of stitches. Further, in the invention, it is also possible to insert the first direction second weft insertion yarns 48a and the second direction second weft insertion yarns 48b in zigzags over four rows, or five or more rows of wales.

Further, multi-filament yarns of polyester fiber are utilized for the chain knitting yarns 15, the first direction second weft insertion yarns 48a, and the second direction second weft insertion yarns 48b which form the sewn areas 41. In addition, the chain knitting yarns 15 disposed in the sewn areas 41 have the same fineness as the chain knitting yarns 15 disposed in the surface fastener area 42.

Meanwhile, the first direction second weft insertion yarns 48a and the second direction second weft insertion yarns 48b have a larger fineness than the first weft insertion yarns 47 disposed in the surface fastener area 42, and moreover, have a fineness of ≥167 decitex ≤660 decitex. In particular, the first direction second weft insertion yarns 48a and the second direction second weft insertion yarns 48b of the fourth embodiment are composed of one yarn having a fineness of 330 decitex (330 decitex.times.one yarn). In this case, an average weight of the weft insertion yarns per unit area disposed in the sewn areas 41 is set to be larger than an average weight of the weft insertion yarns per unit area disposed in the surface fastener area 42.

Such a female knitted surface fastener 40 of the fourth embodiment, as in the cases of the knitted surface fasteners 10 to 30 of the first to the third embodiments described above, is utilized as a fastening member to fasten the cover material 2 to the cushion member 3 in the vehicle-use seat 1.

In the knitted surface fastener 40 of the fourth embodiment, since the first weft insertion yarns 47, which are disposed between two needles in the surface fastener area 42, have a smaller fineness than the first direction second weft insertion yarns 48a and the second direction second weft insertion yarns 48b which are disposed in the sewn areas 41, it is possible to enhance flexibility of the surface fastener area 42 and form the surface fastener area 42 thinly while ensuring stable engaging force of the surface fastener area 42 as in the cases of the knitted surface fasteners 10 to 30 of the first to the third embodiments described above. Further, it is also possible to achieve weight reduction of the whole knitted surface fastener 40 and production costs reduction by reduction of unit requirement.

Especially in the knitted surface fastener 40 of the fourth embodiment, since a swing width of the first weft insertion yarns 47 which are inserted in the surface fastener area 42 is made two wales, for example compared to a case that a swing width of the first weft insertion yarns 47 which are inserted in the surface fastener area 42 is made three or more wales, it is possible to further enhance flexibility and elasticity of the surface fastener area 42 and to comprise the surface fastener area 42 to be easily bent to a front and back direction of the knitted surface fastener 40.

Therefore, for example even in a case that a more or less error occurs in the dimension of the cover material 2 when the knitted surface fastener 40 of the fourth embodiment is attached to the cover material 2 of the vehicle-use seat 1 (See FIG. 5), it is possible to stably dispose the female engagement elements of the knitted surface fastener 40 at the tip of the end part of the cover pieces 2a since the position of the surface fastener area 42 with respect to the cover material 2 can be adjusted easily. Meanwhile, since the sewn areas 41 does not have elasticity compared to the surface fastener area 42, and forms the non-elastic warp knitting structure daringly, the right and left sewn areas 41 are firmly sewn to the seam portion 2b of the cover material 2 by the sewn yarns 7.

Further in the female knitted surface fastener 40 of the fourth embodiment, the first weft insertion yarns 47 disposed in the surface fastener are 42 are inserted in zigzags over two rows of wales, the first direction second weft insertion yarns 48a as well as the second direction second weft insertion yarns 48b disposed in the sewn areas 41 are inserted in zigzags over three rows of wales, and the swing width of each weft insertion yarn is made smaller than that of the first weft insertion yarns 17 and the second weft insertion yarns 18 of the knitted surface fastener 10 in the first embodiment described above. Therefore, it is possible to more efficiently carry out the knitting process of the knitted surface fastener 40 by the warp knitting machine, compared to the knitted surface fastener 10 in the first embodiment described above, so as to further enhance productivity (production efficiency) of the knitted surface fastener 40.

In addition, in the knitted surface fastener 40 of the fourth embodiment, by making the first direction second weft insertion yarns 48a and the second direction second weft insertion yarns 48b disposed in the sewn areas 41 thicker than the first weft insertion yarns 47 disposed in the surface fastener area 42, as in the cases of the knitted surface fasteners 10 to 30 in the first to the third embodiments described above, due to the small tension force of the chain knitting yarns 15 in the sewn areas 41 when the knitted surface fastener 40 is knitted, collapsing the shapes of the chain knitting which are knitted in the sewn areas 41 and causing weft insertion yarns which are inserted in the sewn areas 41 to become loose can be prevented. Further, it is also possible to smoothly perform conveying operation by the conveying roller and winding operation at the winding portion.

DESCRIPTION OF REFERENCE NUMERAL

1 Vehicle-use seat
1a Seat cushion (Sitting part)
1b Seat back (Back pad part)
2 Cover material
2a Cover piece
2b Seam portion
3 Cushion member
4 Design groove
5 Concave groove
7 Sewing yarn
9 Male surface fastener
9a Male engagement element
10 Knitted surface fastener
11 Sewn area
12 Surface fastener area
12a Female engagement element
15 Chain knitting yarn
16 Tricot knitting yarn
17 First weft insertion yarn
18 Second weft insertion yarn
20 Knitted surface fastener
21 Sewn area
22 Surface fastener area
23 Connection area
27a, 27b First weft insertion yarn
28 Second weft insertion yarn
30 Knitted surface fastener
31 Sewn area
32 Surface fastener area
37a First direction first weft insertion yarn
37b Second direction first weft insertion yarn
38a First direction second weft insertion yarn
38b Second direction second weft insertion yarn
40 Knitted surface fastener
41 Sewn area
42 Surface fastener area
47 First weft insertion yarn
48a First direction second weft insertion yarn
48b Second direction second weft insertion yarn

What is claimed is:

1. A knitted surface fastener comprising:
   a pair of right and left sewn areas which are capable of being sewn to a surface fastener adherend and are composed of a plurality of wales; and
   a surface fastener area which is disposed between the right and left sewn areas and is composed of a plurality of wales, and in which a plurality of female engagement elements are disposed on one surface, being composed of warp knitting structure including:
   chain knitting yarns which form each wale of the sewn areas and the surface fastener area;
   tricot knitting yarns which are disposed in the surface fastener area and which form the female engagement elements; and
   a plurality of weft insertion yarns which are disposed in zigzags over two or more adjacent rows of wales, the knitted surface fastener wherein
   an average weight of the weft insertion yarns per unit area in the sewn areas is larger than an average weight of the weft insertion yarns per unit area in the surface fastener area.

2. The knitted surface fastener according to claim 1, wherein the weft insertion yarns comprise first weft insertion yarns having a predetermined fineness and second weft insertion yarns having a larger fineness than the first weft insertion yarns.

3. The knitted surface fastener according to claim 2, wherein
   the first weft insertion yarns are disposed over two or more rows of wales in the surface fastener area, and
   the second weft insertion yarns are disposed over a wale adjacent to the sewn areas in the surface fastener area and two or more rows of wales in the sewn areas.

4. The knitted surface fastener according to claim 1, wherein the weft insertion yarns include first direction weft insertion yarns running in zigzags over at least some of the plurality of wales in the surface fastener area and second direction weft insertion yarns running in zigzags over at least some of the plurality of wales in the sewn areas in a direction of intersecting between courses with respect to the first direction weft insertion yarns.

5. The knitted surface fastener according to claim 4, wherein
   the first direction weft insertion yarns and the second direction weft insertion yarns are interlaced in stitches on wales adjacent to the sewn areas in the surface fastener area and are folded in opposite directions to each other.

6. The knitted surface fastener according to claim 2, wherein
   one of the first weft insertion yarns is disposed over all wales of the surface fastener area, and
   in each right and left sewn area, one of the second weft insertion yarns is disposed over all wales of each respective sewn area and a wale adjacent to the sewn area in the surface fastener area.

7. The knitted surface fastener according to claim 2, comprising connection areas which are formed of only the first weft insertion yarns or the second weft insertion yarns and are between the surface fastener area and the sewn areas.

8. The knitted surface fastener according to claim 7, wherein in the surface fastener area, one of the first weft insertion yarns strides over the connection areas and is disposed over all wales of the surface fastener area and a wale adjacent to one of the connection areas in the respective sewn area, and a plurality of the first weft insertion yarns is disposed over two or more rows of wales, and in each right and left sewn area, one of the second weft insertion yarns is disposed over all wales of the sewn areas, respectively.

9. The knitted surface fastener according to claim 4, wherein in the surface fastener area and in the right and left sewn areas, a plurality of the first direction weft insertion yarns run over three or more rows of wales and a plurality of the second direction weft insertion yarns run over a same number of rows of wales as the first direction weft insertion yarns, and stitches on a wale, in which both the first direction weft insertion yarns and the second direction weft insertion yarns are interlaced into a same course and are folded in the opposite direction to each other, are disposed diagonally in the warp knitting structure.

10. The knitted surface fastener according to claim 4, wherein a first plurality of the first direction weft insertion yarns run over two rows of wales in the surface fastener area, and a second plurality of the first direction weft insertion yarns and a plurality of the second direction weft insertion yarns are disposed in each of the right and left sewn areas.

* * * * *